United States Patent
Ishiyama

(10) Patent No.: US 7,880,530 B2
(45) Date of Patent: Feb. 1, 2011

(54) POWER SUPPLY CIRCUIT, DISPLAY DRIVER, ELECTRO-OPTICAL DEVICE, AND ELECTRONIC INSTRUMENT

(75) Inventor: Hisanobu Ishiyama, Chino (JP)

(73) Assignee: Seiko Epson Corporation, Tokyo (JP)

( * ) Notice: Subject to any disclaimer, the term of this patent is extended or adjusted under 35 U.S.C. 154(b) by 732 days.

(21) Appl. No.: 11/882,389

(22) Filed: Aug. 1, 2007

(65) Prior Publication Data
US 2008/0036529 A1 Feb. 14, 2008

(30) Foreign Application Priority Data
Aug. 10, 2006 (JP) ............................. 2006-217977

(51) Int. Cl.
H02M 3/18 (2006.01)
H02M 7/00 (2006.01)
G05F 1/10 (2006.01)
G02F 3/02 (2006.01)

(52) U.S. Cl. .......................................... 327/536; 363/59
(58) Field of Classification Search ................... 363/59; 327/536
See application file for complete search history.

(56) References Cited

U.S. PATENT DOCUMENTS

| | | | | |
|---|---|---|---|---|
| 6,242,970 B1 * | 6/2001 | Grant et al. ................. | 327/536 |
| 6,512,411 B2 * | 1/2003 | Meng et al. .................. | 327/536 |
| 6,643,151 B1 * | 11/2003 | Nebrigic et al. ............... | 363/59 |
| 6,657,875 B1 * | 12/2003 | Zeng et al. ..................... | 363/59 |
| 6,920,055 B1 * | 7/2005 | Zeng et al. ..................... | 363/59 |
| 2002/0109540 A1 * | 8/2002 | Meng .......................... | 327/536 |
| 2007/0024347 A1 * | 2/2007 | Nagasawa et al. ........... | 327/536 |

FOREIGN PATENT DOCUMENTS

JP A 2005-57860 3/2005

* cited by examiner

Primary Examiner—Bao Q Vu
Assistant Examiner—Jue Zhang
(74) Attorney, Agent, or Firm—Oliff & Berridge, PLC

(57) ABSTRACT

A power supply circuit which boosts a given voltage to generate one or more power supply voltages includes a charge-pump control circuit including switching elements for generating a boost voltage by a charge-pump operation using charge stored in a flying capacitor, a soft-start circuit which prevents a rush current toward the flying capacitor, and a power supply generation circuit which is connected with a stabilization capacitor and generates a power supply voltage using the boost voltage as a power supply. After the power supply generation circuit has been turned ON in a state in which the charge-pump control circuit generates the boost voltage by the charge-pump operation, the switching elements are turned OFF, and the soft-start circuit generates the boost voltage by a charge-pump operation.

12 Claims, 16 Drawing Sheets

US 7,880,530 B2

POWER SUPPLY CIRCUIT, DISPLAY DRIVER, ELECTRO-OPTICAL DEVICE, AND ELECTRONIC INSTRUMENT

Japanese Patent Application No. 2006-217977 filed on Aug. 10, 2006, is hereby incorporated by reference in its entirety.

BACKGROUND OF THE INVENTION

The present invention relates to a power supply circuit, a display driver, an electro-optical device, and an electronic instrument.

A further reduction in power consumption is demanded for portable electronic instruments. A liquid crystal device is generally used as a display device provided in such electronic instruments. A plurality of power supply voltages (e.g. high voltage and negative voltage) are required to drive the liquid crystal device. In this case, it is desirable from the viewpoint of cost that a liquid crystal driver device which drives the liquid crystal device include a power supply circuit which generates power supply voltages.

Such a power supply circuit includes a voltage booster circuit. A charge-pump circuit which generates a voltage boosted by a charge-pump operation is generally employed as the voltage booster circuit. The charge-pump circuit connects one end of a capacitor storing a charge with various voltages using switching elements (e.g. metal oxide semiconductor (MOS) transistors), thereby boosting a voltage corresponding to the charge stored in the capacitor. Power consumption can be reduced using such a charge-pump circuit.

In order to increase the boost efficiency of the charge-pump circuit, the loss of charge must be reduced as much as possible. Therefore, the charge-pump circuit is configured so that the switching elements have an on-resistance as low as possible. However, since a charge is not stored in the capacitor immediately before activating the charge-pump circuit, a large current (rush current) flows immediately after startup.

In order to solve this problem, a boost operation is performed using a soft-start circuit immediately after startup. Such a soft-start circuit is disclosed in JP-A-2005-57860, for example.

When using a charge-pump circuit as a first-order voltage booster circuit, a second-order voltage booster circuit, a third-order voltage booster circuit, a regulator, or the like (power supply generation circuit in a broad sense) operates using a boost voltage generated by the first-order voltage booster circuit as a power supply voltage. The second-order voltage booster circuit or the like is generally started up after the startup timing of the first-order voltage booster circuit. This is because the second-order voltage booster circuit or the like aims at stably utilizing the boost voltage of the first-order voltage booster circuit or preventing latchup caused by a large current which occurs immediately after startup of the second-order voltage booster circuit or the like.

On the other hand, the second-order voltage booster circuit or the like is also connected with a flying capacitor for a charge-pump operation and an output stabilization capacitor. Therefore, the second-order voltage booster circuit or the like is configured so that a switching element (transistor) in the power supply output stage has a low on-resistance in order to enable efficient charge storage, for example. In this case, the technology disclosed in JP-A-2005-57860 can prevent a rush current when activating (turning ON) the first-order voltage booster circuit, but cannot prevent a rush current when activating the second-order voltage booster circuit or the like.

SUMMARY

According to one aspect of the invention, there is provided a power supply circuit which boosts a given voltage to generate one or more power supply voltages, the power supply circuit comprising:

a charge-pump control circuit including switching elements for generating a boost voltage by a charge-pump operation using charge stored in a flying capacitor;

a soft-start circuit which prevents a rush current from flowing into the flying capacitor; and a power supply generation circuit which is connected with a stabilization capacitor and generates a power supply voltage using the boost voltage as a power supply;

after the power supply generation circuit has been turned ON in a state in which the charge-pump control circuit generates the boost voltage by the charge-pump operation, the switching elements being turned OFF, and the soft-start circuit generating the boost voltage by a charge-pump operation.

According to another aspect of the invention, there is provided a power supply circuit which boosts a given voltage to generate one or more power supply voltages, the power supply circuit comprising:

a charge-pump control circuit including switching elements for generating a boost voltage by a charge-pump operation using charge stored in a flying capacitor;

a soft-start circuit which prevents a rush current from flowing into the flying capacitor; and a power supply generation circuit which is connected with a stabilization capacitor and generates a power supply voltage using the boost voltage as a power supply;

wherein, after the power supply circuit has been turned ON, the power supply generation circuit is turned ON in a state in which the switching elements are turned OFF, the soft-start circuit then generates the boost voltage by a charge-pump operation, and the charge-pump control circuit then generates the boost voltage by the charge-pump operation by switch-controlling the switching elements.

According to a further aspect of the invention, there is provided a display driver which drives an electro-optical device, the display driver comprising:

a source driver which drives source lines of the electro-optical device; and one of the above power supply circuits which generates a power supply for the source driver.

According to still another aspect of the invention, there is provided an electro-optical device comprising:

gate lines;
source lines;
pixel electrodes;
a gate line driver circuit which scans the gate lines;
a source driver which drives the source lines based on grayscale data; and
one of the above power supply circuits which generates a power supply for at least one of the gate driver and the source driver.

According to a still further aspect of the invention, there is provided an electronic instrument comprising one of the above power supply circuits or the above electro-optical device.

DETAILED DESCRIPTION OF THE EMBODIMENT

Figure 1:
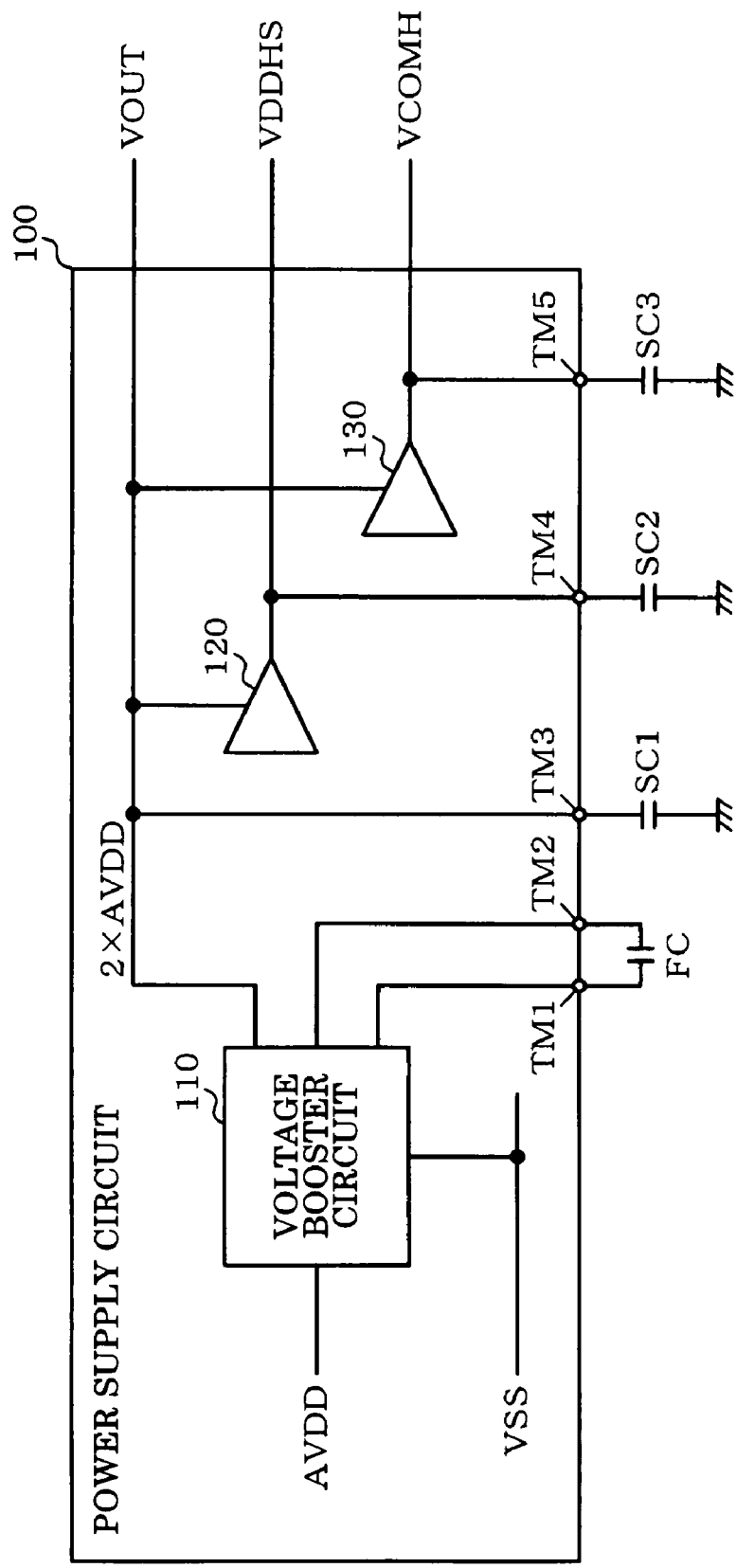
FIG. 1 is a view showing an outline of the configuration of a power supply circuit according to one embodiment of the invention.

Aspects of the invention provide a power supply circuit capable of preventing a rush current even when generating power supply voltages at different timings, a display driver, an electro-optical device, and an electronic instrument.

According to one embodiment of the invention, there is provided a power supply circuit which boosts a given voltage to generate one or more power supply voltages, the power supply circuit comprising:

a charge-pump control circuit including switching elements for generating a boost voltage by a charge-pump operation using charge stored in a flying capacitor;

a soft-start circuit which prevents a rush current from flowing into the flying capacitor; and a power supply generation circuit which is connected with a stabilization capacitor and generates a power supply voltage using the boost voltage as a power supply;

after the power supply generation circuit has been turned ON in a state in which the charge-pump control circuit generates the boost voltage by the charge-pump operation, the switching elements being turned OFF, and the soft-start circuit generating the boost voltage by a charge-pump operation.

According to this embodiment, when the power supply generation circuit is provided which is connected with the stabilization capacitor and generates the power supply voltage using the boost voltage boosted by the charge-pump operation as the power supply voltage, the power supply generation circuit is turned ON (activated) in a state in which the boost voltage is generated by the charge-pump operation of the charge-pump control circuit. In this case, the switching elements of the charge-pump control circuit are turned OFF, and the boost voltage is generated by the charge-pump operation of the soft-start circuit. This prevents a large current from flowing into the flying capacitor and the stabilization capacitor by the soft-start circuit which performs the charge-pump operation instead of the charge-pump control circuit. As a result, a change in the voltage level of the input voltage of the power supply circuit (first-order voltage booster circuit) is prevented.

In the power supply circuit, the soft-start circuit may generate the boost voltage by the charge-pump operation immediately after the power supply circuit has been turned ON, and the charge-pump control circuit may then generate the boost voltage by the charge-pump operation.

According to this embodiment, since a rush current is also suppressed by the soft-start circuit immediately after turning ON (activating) the power supply circuit, a change in the voltage level of the input voltage of the power supply circuit (first-order voltage booster circuit) is prevented while achieving the above effects.

In the power supply circuit, the soft-start circuit may include switching elements provided in parallel with the switching elements of the charge-pump control circuit and having an on-resistance higher than those of the switching elements of the charge-pump control circuit.

According to this embodiment, the soft-start circuit can be formed using a simple configuration.

In the power supply circuit, after the power supply circuit has been turned ON, the switching elements of the soft-start circuit may be switch-controlled irrespective of whether or not to switch-control the switching elements of the charge-pump control circuit.

According to this embodiment, the switching elements of the charge-pump control circuit and the soft-start circuit can be simply switch-controlled, and the charge-pump operation of the soft-start circuit can be assisted.

According to another embodiment of the invention, there is provided a power supply circuit which boosts a given voltage to generate one or more power supply voltages, the power supply circuit comprising:

a charge-pump control circuit including switching elements for generating a boost voltage by a charge-pump operation using charge stored in a flying capacitor;

a soft-start circuit which prevents a rush current from flowing into the flying capacitor; and a power supply generation circuit which is connected with a stabilization capacitor and generates a power supply voltage using the boost voltage as a power supply;

wherein, after the power supply circuit has been turned ON, the power supply generation circuit is turned ON in a state in which the switching elements are turned OFF, the soft-start circuit then generates the boost voltage by a charge-pump operation, and the charge-pump control circuit then generates the boost voltage by the charge-pump operation by switch-controlling the switching elements.

According to this embodiment, a rush current flowing into the flying capacitor and the stabilization capacitor can be suppressed, even if the power supply generation circuit is activated after the power supply circuit has been turned ON (activated), whereby a change in the voltage level of the input voltage of the power supply circuit (first-order voltage booster circuit) is prevented.

According to a further embodiment of the invention, there is provided a display driver which drives an electro-optical device, the display driver comprising:

a source driver which drives source lines of the electro-optical device; and one of the above power supply circuits which generates a power supply for the source driver.

According to this embodiment, a display driver can be provided which includes a power supply circuit capable of preventing a rush current even when generating power supply voltages at different timings.

According to still another embodiment of the invention, there is provided an electro-optical device comprising:
 gate lines;
 source lines;
 pixel electrodes;
 a gate line driver circuit which scans the gate lines;
 a source driver which drives the source lines based on grayscale data; and
 one of the above power supply circuits which generates a power supply for at least one of the gate driver and the source driver.

According to this embodiment, an electro-optical device can be provided which includes a power supply circuit capable of preventing a rush current even when generating power supply voltages at different timings.

According to a still further embodiment of the invention, there is provided an electronic instrument comprising one of the above power supply circuits.

According to yet another embodiment of the invention, there is provided an electronic instrument comprising the above electro-optical device.

According to the above embodiment, an electronic instrument can be provided which includes a power supply circuit capable of preventing a rush current even when generating power supply voltages at different timings.

The embodiments of the invention are described below in detail with reference to the drawings. Note that the embodiments described below do not in any way limit the scope of the invention laid out in the claims. Note that all of the elements of the embodiments described below should not necessarily be taken as essential requirements for the invention.

1. Power Supply Circuit

FIG. 1 shows an outline of the configuration of a power supply circuit according to this embodiment.

A power supply circuit 100 boosts the voltage between a system power supply voltage AVDD and a system ground power supply voltage VSS to generate one or more power supply voltages. The power supply circuit 100 includes a voltage booster circuit 110. The voltage booster circuit 110 performs a charge-pump operation of generating a boost voltage using a charge stored in a flying capacitor. The power supply circuit 100 also includes regulators 120 and 130 as power supply generation circuits. The regulators 120 and 130 operate using the boost voltage generated by the voltage booster circuit 110 as the power supply voltage.

Specifically, the power supply circuit 100 generates the boost voltage by twofold boosting the voltage between the system power supply voltage AVDD and the ground power supply voltage VSS in the positive direction with respect to the ground power supply voltage VSS. The power supply circuit 100 outputs the boost voltage as a power supply voltage VOUT. The regulator 120 operates using the power supply voltage VOUT as a high-potential-side power supply voltage, and outputs a power supply voltage VDDHS. The regulator 130 operates using the power supply voltage VOUT as a high-potential-side power supply voltage, and outputs a power supply voltage VCOMH.

The voltage booster circuit 110 is connected with a flying capacitor FC via terminals TM1 and TM2 in order to perform a twofold charge-pump operation. A power supply line to which the boost voltage generated by the voltage booster circuit 110 is output is connected via a terminal TM3 with one end of a stabilization capacitor SC1 provided outside the power supply circuit 100. An output power supply line of the regulator 120 is connected via a terminal TM4 with one end of a stabilization capacitor SC2 provided outside the power supply circuit 100. An output power supply line of the regulator 130 is connected via a terminal TM5 with one end of a stabilization capacitor SC3 provided outside the power supply circuit 100. The system ground power supply voltage VSS is supplied to the other end of each of the stabilization capacitors SC1, SC2, and SC3, for example.

A change in the voltage of the output node of the voltage booster circuit 110 can be suppressed, even if the voltage level of the output destination of the voltage booster circuit 110 has changed due to an external factor or the like, by increasing the capacitance of the stabilization capacitor SC1 as compared with the load capacitance of the output node of the voltage booster circuit 110, whereby the stabilization capacitor SC1 can stabilize the voltage booster circuit 110 even when limiting the drive capability of the voltage booster circuit 110. A change in the voltages of the output nodes of the regulators 120 and 130 can be suppressed, even if the voltage levels of the output destinations of the regulators 120 and 130 have changed due to an external factor or the like, by increasing the capacitances of the stabilization capacitors SC2 and SC3 as compared with the load capacitances of the output nodes of the regulators 120 and 130, whereby the stabilization capacitors SC2 and SC3 can stabilize the regulators 120 and 130, even when limiting the drive capabilities of the regulators 120 and 130.

FIG. 1 shows an example in which the voltage booster circuit 110 as a first-order voltage booster circuit has a boost factor of two. Note that this embodiment is not limited to the boost factor. FIG. 1 shows an example in which the regulators 120 and 130 are provided as the power supply generation circuits. Note that the number of power supply generation circuits is not limited thereto. The number of power supply generation circuits may be one or three or more. FIG. 1 shows an example in which the regulator is provided as the power supply generation circuit. Note that the power supply generation circuit according to this embodiment is not limited to the regulator. The power supply generation circuit may be a voltage booster circuit (charge-pump circuit).

Figure 2:
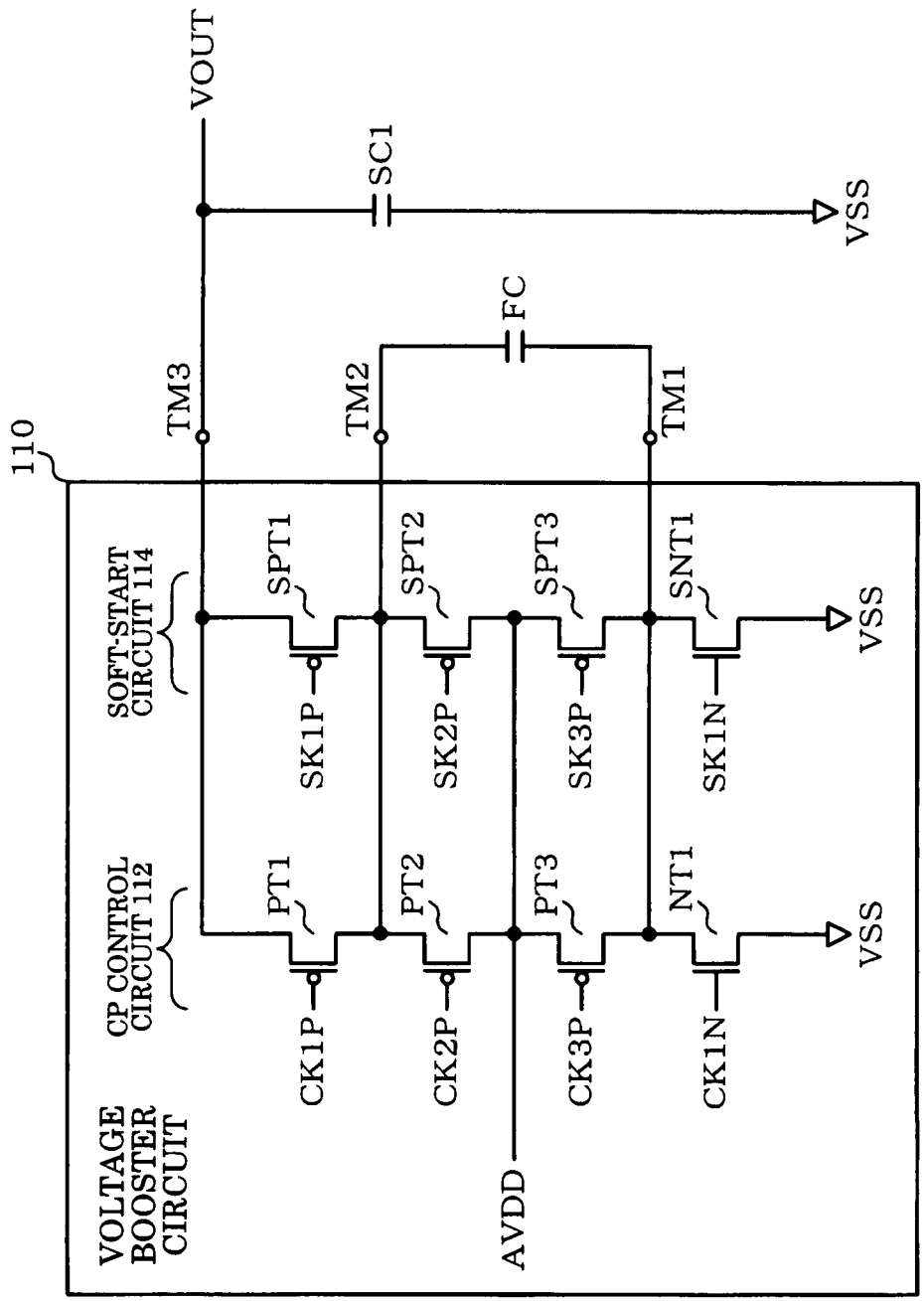
FIG. 2 is a circuit diagram showing a configuration example of a voltage booster circuit shown in FIG. 1.

FIG. 2 is a circuit diagram of a configuration example of the voltage booster circuit 110 shown in FIG. 1.

In FIG. 2, the same sections as in FIG. 1 are indicated by the same symbols. Description of these sections is appropriately omitted.

The voltage booster circuit 110 includes a charge-pump (herein abbreviated as "CP") control circuit 112 and a soft-start circuit 114. The CP control circuit 112 performs a charge-pump operation of charging/discharging the flying capacitor FC. The soft-start circuit 114 prevents a rush current from flowing into the flying capacitor.

The CP control circuit 112 includes switching elements for generating the boost voltage by a charge-pump operation utilizing charge stored in the flying capacitor FC. Specifically, the CP control circuit 112 includes P-type (first conductivity type in a broad sense) MOS transistors (hereinafter simply called "transistors") PT1 and PT2 inserted in series between an output power supply line to which the boost voltage is output and a power supply line to which the system power supply voltage AVDD is supplied. The CP control circuit 112 also includes a P-type MOS transistor PT3 and an N-type (second conductivity type in a broad sense) MOS transistor (hereinafter simply called "transistor") NT1 inserted in series between the power supply line to which the system power supply voltage AVDD is supplied and a power supply line to which the system ground power supply voltage VSS is supplied.

A charge clock signal CK1P is supplied to the gate of the transistor PT1. A charge clock signal CK2P is supplied to the gate of the transistor PT2. A charge clock signal CK3P is supplied to the gate of the transistor PT3. A charge clock signal CK1N is supplied to the gate of the transistor NT1.

The power supply line to which the boost voltage is output is connected with the source of the transistor PT1. One end of the flying capacitor FC is connected with a connection node of the transistors PT1 and PT2 via the terminal TM2. The other end of the flying capacitor FC is connected with a connection node of the transistors PT3 and NT1 via the terminal TM1.

Figure 3:
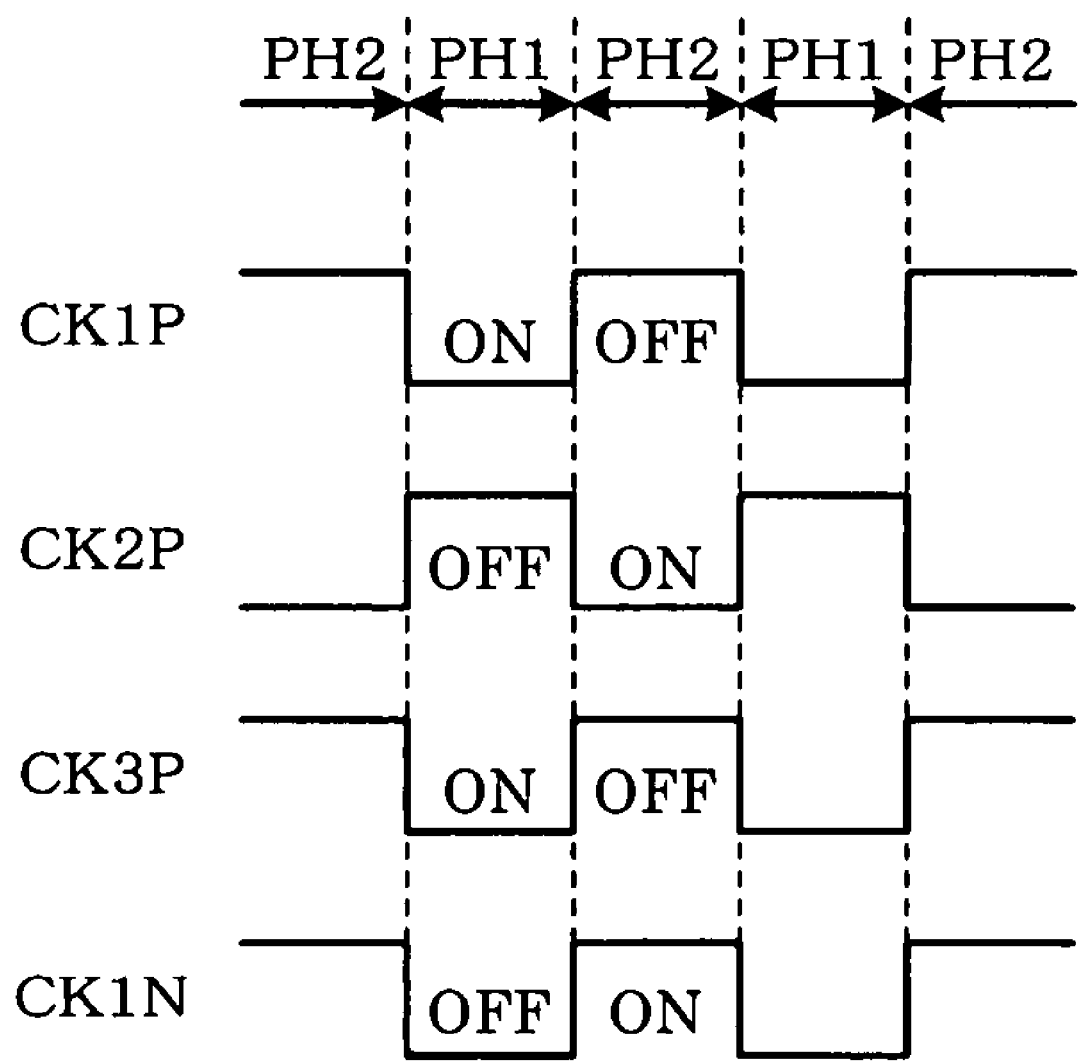
FIG. 3 is a view schematically showing the timing of a charge clock signal shown in FIG. 2.

FIG. 3 schematically shows the timings of the charge clock signals CK1P, CK2P, CK3P, and CK1N shown in FIG. 2.

When the charge clock signal CK1P is set at the L level, the charge clock signal CK2P is set at the H level, and the charge clock signals CK3P and CK1N are set at the L level (period PH1). When the charge clock signal CK1P is set at the H level, the charge clock signal CK2P is set at the H level, and the charge clock signals CK3P and CK1N are set at the H level (period PH2).

In the period PH1, the transistor PT1 is turned ON and the transistor PT2 is turned OFF, whereby the voltage of one end of the flying capacitor FC1 connected with the terminal TM2 is output to the output power supply line via the terminal TM3. In this case, the transistor PT3 is turned ON and the transistor NT1 is turned OFF, whereby the system power supply voltage AVDD is supplied to the other end of the flying capacitor FC connected with the terminal TM1.

In the period PH2, the transistor PT1 is turned OFF and the transistor PT2 is turned ON, whereby the system power supply voltage AVDD is supplied to one end of the flying capacitor FC connected with the terminal TM2. In this case, the transistor PT3 is turned OFF and the transistor NT1 is turned ON, whereby the system ground power supply voltage VSS is supplied to the other end of the flying capacitor FC connected with the terminal TM1. Therefore, a charge corresponding to the voltage between the system power supply voltage AVDD and the system ground power supply voltage VSS is stored in the flying capacitor FC in the period PH2.

In the period PH1, the voltage of one end of the flying capacitor FC is again output to the output power supply line, as described above. In this case, since the other end of the flying capacitor FC connected with the terminal TM1 is set at the system power supply voltage AVDD, the voltage of the output power supply line is twice the voltage between the system power supply voltage AVDD and the system ground power supply voltage VSS. Since the stabilization capacitor SC1 stores a charge corresponding to the voltage of the output power supply line, the voltage corresponding to the charge stored in the stabilization capacitor SC1 is output as the boost voltage in the period PH2, and charge is stored in the stabilization capacitor SC1 in the period PH1 as described above.

It is desirable to change the charge clock signals CK1P and CK2P so that the transistors PT1 and PT2 are not turned ON at the same time. It is desirable to change the charge clock signals CK2P and CK3P so that the transistors PT2 and PT3 are not turned ON at the same time. It is also desirable to change the charge clock signals CK3P and CK1N so that the transistors PT3 and NT1 are not turned ON at the same time.

In order to increase the boost efficiency of the voltage booster circuit 110, it is desirable to reduce the loss of charge as much as possible. Therefore, the CP control circuit 112 is configured so that the transistor PT1 to PT3 and NT1 have an on-resistance as low as possible. Accordingly, a very large current flows immediately after startup (ON) because charge is not stored in the flying capacitor FC and the stabilization capacitor SC1.

Figure 4A:
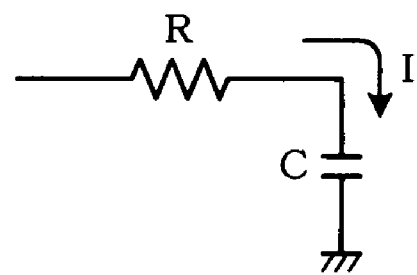
FIGS. 4A and 4B are views illustrative of a rush current.
Figure 4B:
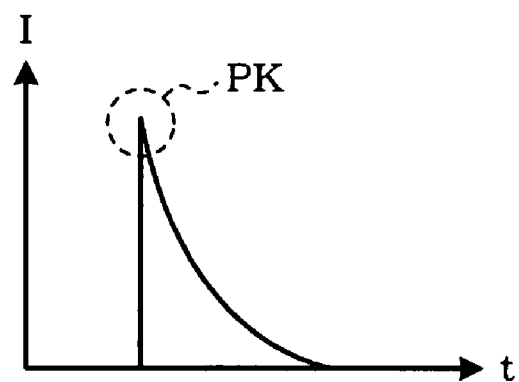

FIGS. 4A and 4B are views illustrative of a rush current.

It is desirable that the stabilization capacitor SC1 have a large capacitance, as described above, in order to stabilize the output power supply line. For example, the capacitance C of the stabilization capacitor SC1 is 1 microfarad. When the combined resistance R of the on-resistance and the wiring resistance of the CP control circuit 112 during output is 5 ohms, a current exceeding 100 milliamperes may flow in the circuit configuration shown in FIG. 4A, for example. In FIG. 4B in which the horizontal axis indicates time and the vertical axis indicates current, a rush current occurs in the portion enclosed by a circle PK. The rush current causes latchup or changes the level of the system power supply voltage AVDD.

Therefore, the soft-start circuit 114 shown in FIG. 2 prevents the rush current. Specifically, the boost voltage is generated by the charge-pump operation of the soft-start circuit 114 immediately after the power supply circuit 100 (voltage booster circuit 110) is turned ON (activated), and the boost voltage is then generated by the charge-pump operation of the CP control circuit 112. The soft-start circuit 114 includes switching elements provided in parallel with the switching elements of the CP control circuit 112 and having an on-resistance higher than those of the switching elements of the CP control circuit 112. The soft-start circuit 114 operates at the same timing as the CP control circuit 112.

Specifically, the soft-start circuit 114 includes P-type MOS transistors (hereinafter simply called transistors) SPT1 and SPT2 inserted in series between the output power supply line to which the boost voltage is output and the power supply line to which the system power supply voltage AVDD is supplied. The soft-start circuit 114 also includes a P-type MOS transistor SPT3 and an N-type (second conductivity type in a broad sense) MOS transistor (hereinafter simply called "transistor") SNT1 inserted in series between the power supply line to which the system power supply voltage AVDD is supplied and the power supply line to which the system ground power supply voltage VSS is supplied.

The source-drain resistance (on-resistance) when the transistor SPT1 is turned ON is higher than the source-drain resistance (on-resistance) when the transistor PT1 is turned ON. The source-drain resistance (on-resistance) when the transistor SPT2 is turned ON is higher than the source-drain resistance (on-resistance) when the transistor PT2 is turned ON. The source-drain resistance (on-resistance) when the transistor SPT3 is turned ON is higher than the source-drain resistance (on-resistance) when the transistor PT3 is turned ON. The source-drain resistance (on-resistance) when the transistor SNT1 is turned ON is higher than the source-drain resistance (on-resistance) when the transistor NT1 is turned ON.

A charge clock signal SK1P is supplied to the gate of the transistor SPT1. A charge clock signal SK2P is supplied to the gate of the transistor SPT2. A charge clock signal SK3P is supplied to the gate of the transistor SPT3. A charge clock signal SK1N is supplied to the gate of the transistor SNT1.

The power supply line to which the boost voltage is output is connected with the source of the transistor SPT1. One end of the flying capacitor FC is connected with a connection node of the transistors SPT1 and SPT2 via the terminal TM2. The other end of the flying capacitor FC is connected with a connection node of the transistors SPT3 and SNT1 via the terminal TM1.

Since the soft-start circuit 114 is configured as described above, the boost efficiency decreases as compared with the charge-pump operation of the CP control circuit 112 when operating the charge clock signals SK1P to SK3P and SK1N at the same timings as the charge clock signals CK1P to CK3P and CK1N. However, a rush current flowing into the flying capacitor FC and the stabilization capacitor SC1 can be suppressed.

In this embodiment, immediately after activating the power supply circuit 100, the boost voltage is generated by causing the soft-start circuit 114 to perform the charge-pump operation. In this embodiment, after activating (turning ON) the regulators 120 and 130 (power supply generation circuits) in a state in which the boost voltage is generated by the charge-pump operation of the CP control circuit 112, the transistors PT1 to PT3 and NT1 of the CP control circuit 112 are turned OFF, and the boost voltage is generated by the charge-pump operation of the soft-start circuit 114.

Figure 5:
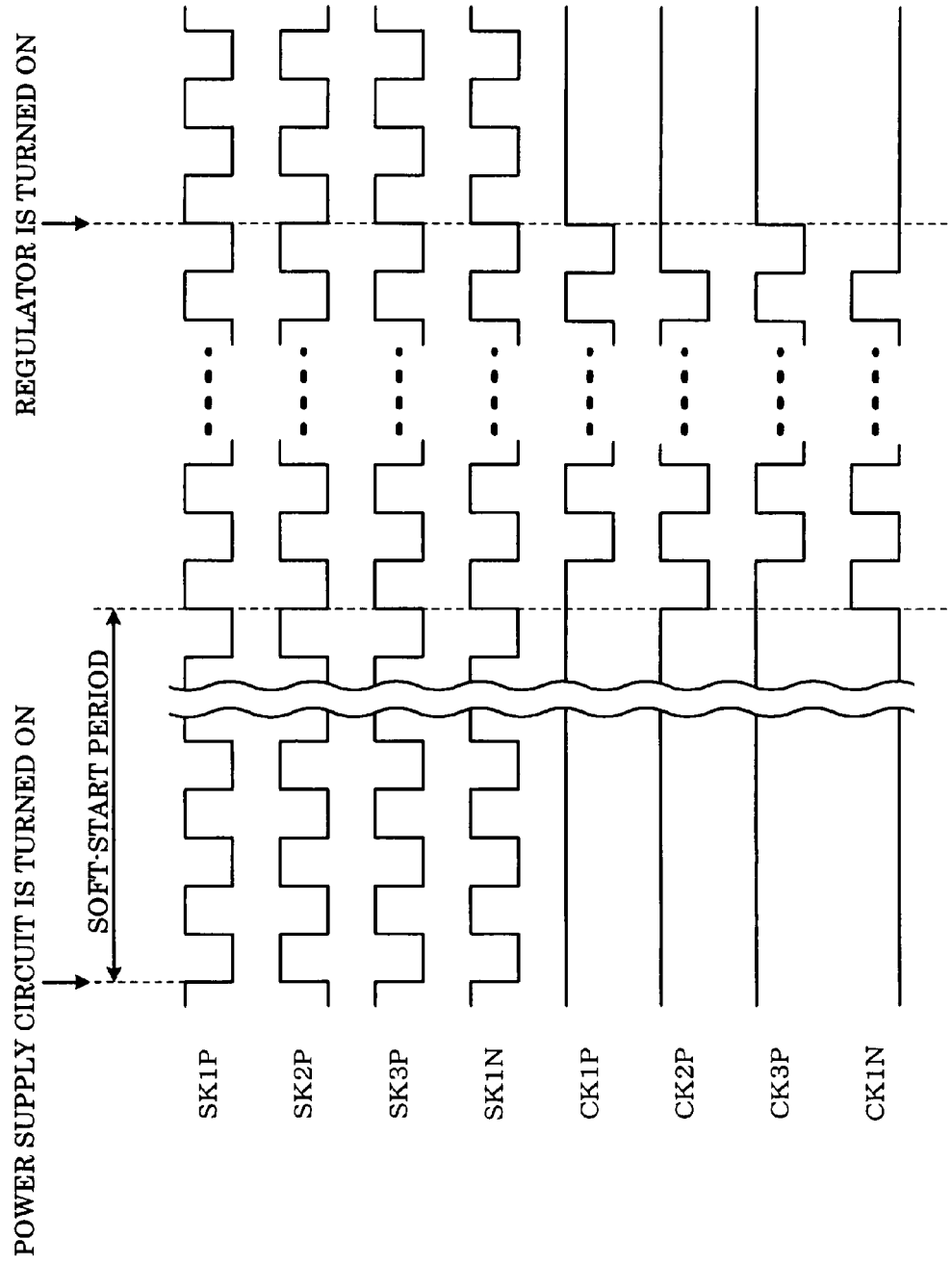
FIG. 5 is a view showing an example of the timing of a charge clock signal.

FIG. 5 shows an example of the timings of the charge clock signals CK1P to CK3P, CK1N, SK1P to SK3P, and SK1N.

When activating the power supply circuit 100, the voltage booster circuit 110 is activated. The regulators 120 and 130 as the power supply generation circuits are then turned ON. A soft-start period starts after the voltage booster circuit 110 has been activated. In the soft-start period, the charge clock signals SK1P to SK3P and SK1N are operated while setting the transistors PT1 to PT3 and NT1 in an OFF state using the charge clock signals CK1P to CK3P and CK1N. Specifically, the charge clock signals SK1P to SK3P and SK1N are operated at the timings shown in FIG. 3 in the soft-start period. As a result, the charge-pump operation is performed by the soft-start circuit 114 in the soft-start period, whereby the boost voltage is generated while preventing a rush current.

The charge clock signals CK1P to CK3P and SK1N are operated when the soft-start period has expired. In this case, since current flows through a path with a low on-resistance, the charge clock signals SK1P to SK3P and SK1N may be continuously operated in the same manner as in the soft-start period. Specifically, after activating the voltage booster circuit 110 (power supply circuit 100), the switching elements of the soft-start circuit 114 are switch-controlled irrespective of whether or not to switch-control the switching elements of the CP control circuit. This simplifies the operation control of the charge clock signals CK1P to CK3P, CK1N, SK1P to SK3P, and SK1N while assisting the charge-pump operation after the soft-start period. As a result, the charge-pump operation is performed by the CP control circuit 112 after the soft-start period. In this case, since charge has been stored in the flying capacitor FC and the stabilization capacitor SC1, a rush current does not occur. Moreover, the boost efficiency can be increased by performing the charge-pump operation using the transistors PT1 to PT3 and NT1.

The regulator 120 is then activated. In this case, the charge clock signals SK1P to SK3P and SK1N are operated while setting the transistors PT1 to PT3 and NT1 in an OFF state using the charge clock signals CK1P to CK3P and CK1N in the same manner as in the soft-start period. Specifically, the charge clock signals SK1P to SK3P and SK1N are operated at the timings shown in FIG. 3. As a result, the charge-pump operation is performed by the soft-start circuit 114, whereby the boost voltage is generated while preventing a rush current. This prevents a rush current flowing into the stabilization capacitor SC2 connected with the output of the regulator 120.

The charge clock signals CK1P to CK3P and SK1N are operated when a given period has expired after activating the regulator 120. In this case, since current flows through a path with a low on-resistance, the charge clock signals SK1P to SK3P and SK1N may be continuously operated in the same manner as in the soft-start period.

After activating the regulator 130, the charge clock signals SK1P to SK3P and SK1N are operated while setting the transistors PT1 to PT3 and NT1 in an OFF state using the charge clock signals CK1P to CK3P and CK1N in the same manner as in the soft-start period.

As described above, a rush current flowing into the stabilization capacitor (or the flying capacitor) connected with each power supply generation circuit can be suppressed by generating the boost voltage using the soft-start circuit 114 while terminating the operation of the CP control circuit 112 each time the power supply generation circuit using the boost voltage generated by the voltage booster circuit 110 as the power supply voltage is activated.

The charge clock signals CK1P to CK3P, CK1N, SK1P to SK3P, and SK1N are generated by a control circuit (not shown) provided inside or outside the power supply circuit 100.

Figure 6A:
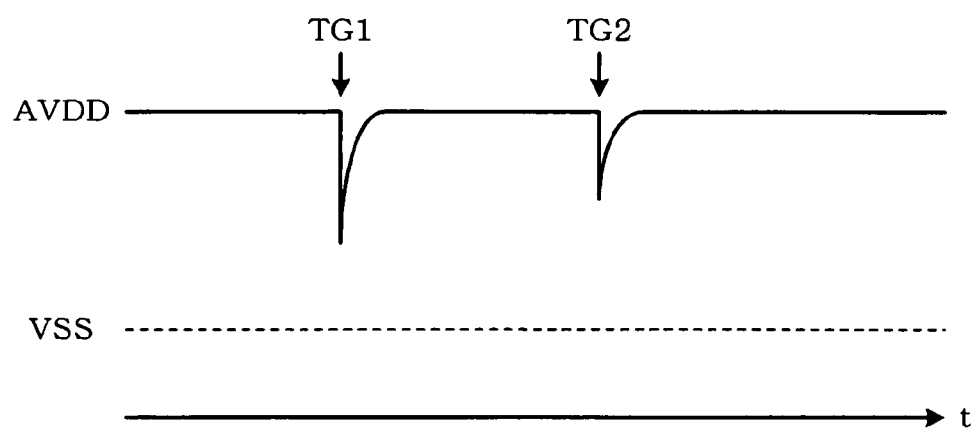
FIGS. 6A and 6B are views illustrative of the effects of one embodiment of the invention.
Figure 6B:
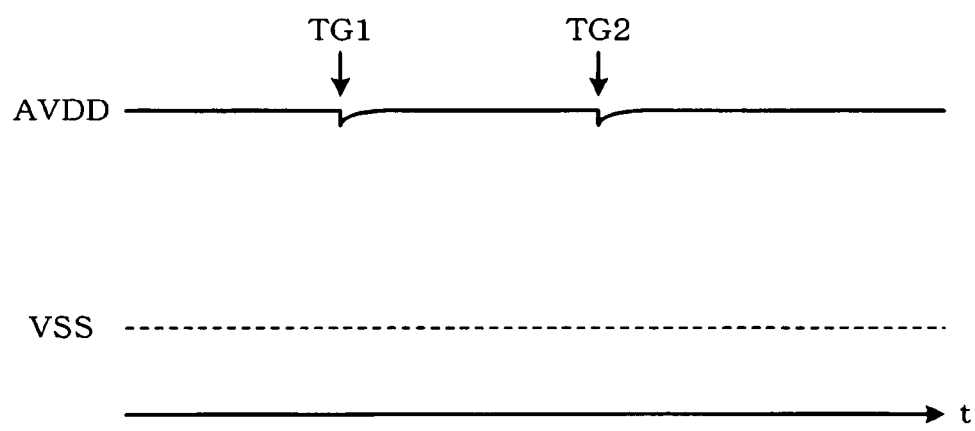

FIGS. 6A and 6B are views illustrative of the effects of this embodiment.

FIG. 6A schematically shows a change in the system power supply voltage AVDD when terminating the operation of the CP control circuit 112 only in the soft-start period shown in FIG. 5.

When the voltage booster circuit 110 (power supply circuit 100) has been turned ON so that the soft-start period has started, the boost voltage is generated by the soft-start circuit 114. When the regulator 120 is activated at a timing TG1, a rush current which flows into the stabilization capacitor SC2 occurs, whereby the potential of the output power supply line of the voltage booster circuit 110 changes. This change in the potential is conveyed to the power supply line to which the system power supply voltage AVDD is supplied via the output power supply line of the voltage booster circuit 110. Therefore, the change in the voltage level of the system power supply voltage AVDD causes other circuits provided with the system power supply voltage AVDD to malfunction.

When the regulator 130 is activated at a timing TG2, a rush current which flows into the stabilization capacitor SC3 occurs, whereby the potential of the output power supply line of the voltage booster circuit 110 again changes. This change in potential is also conveyed to the power supply line to which the system power supply voltage AVDD is supplied via the output power supply line of the voltage booster circuit 110.

FIG. 6B schematically shows a change in the system power supply voltage AVDD when terminating the operation of the CP control circuit 112 each time the regulators 120 and 130 are activated, as shown in FIG. 5.

When the voltage booster circuit 110 has been turned ON so that the soft-start period has started, the boost voltage is generated by the soft-start circuit 114. When the regulator 120 is activated at the timing TG1, only the soft-start circuit 114 operates in FIG. 6B, whereby a rush current which flows into the stabilization capacitor SC2 can be suppressed. Therefore, a change in the potential of the output power supply line of the voltage booster circuit 110 can be suppressed. This prevents a change in the voltage level of the system power supply voltage AVDD from being conveyed, whereby a situation does not occur in which other circuits provided with the system power supply voltage AVDD malfunction.

When the regulator 130 is activated at the timing TG2, a rush current which flows into the stabilization capacitor SC3 can be suppressed. Therefore, a change in the potential of the output power supply line of the voltage booster circuit 110 can be suppressed, whereby a situation does not occur in which other circuits provided with the system power supply voltage AVDD malfunction.

According to this embodiment, when the power supply generation circuit connected with a capacitor such as a stabilization capacitor operates using the boost voltage generated by the voltage booster circuit 110 using the charge pump method as the power supply voltage, the charge-pump operation is performed by the soft-start circuit 114 each time the power supply generation circuit is turned ON after activating the voltage booster circuit 110, as described above. This suppresses a rush current which occurs each time the power supply generation circuit is activated in addition to a rush current which occurs when activating the voltage booster circuit 110.

1.1 Modification

This embodiment has been described taking an example in which the power supply generation circuit is activated after the soft-start period and only the soft-start circuit 114 is operated after activating the power supply generation circuit. Note that this embodiment is not limited thereto.

The configuration of a power supply circuit according to a modification of this embodiment is the same as the configuration of the power supply circuit according to this embodiment. The power supply circuit according to this modification differs from the power supply circuit according to this embodiment as to the startup timing (on-timing or activation timing) of the power supply generation circuit and the operations of the charge clock signals CK1P to CK3P and CK1N.

Figure 7:
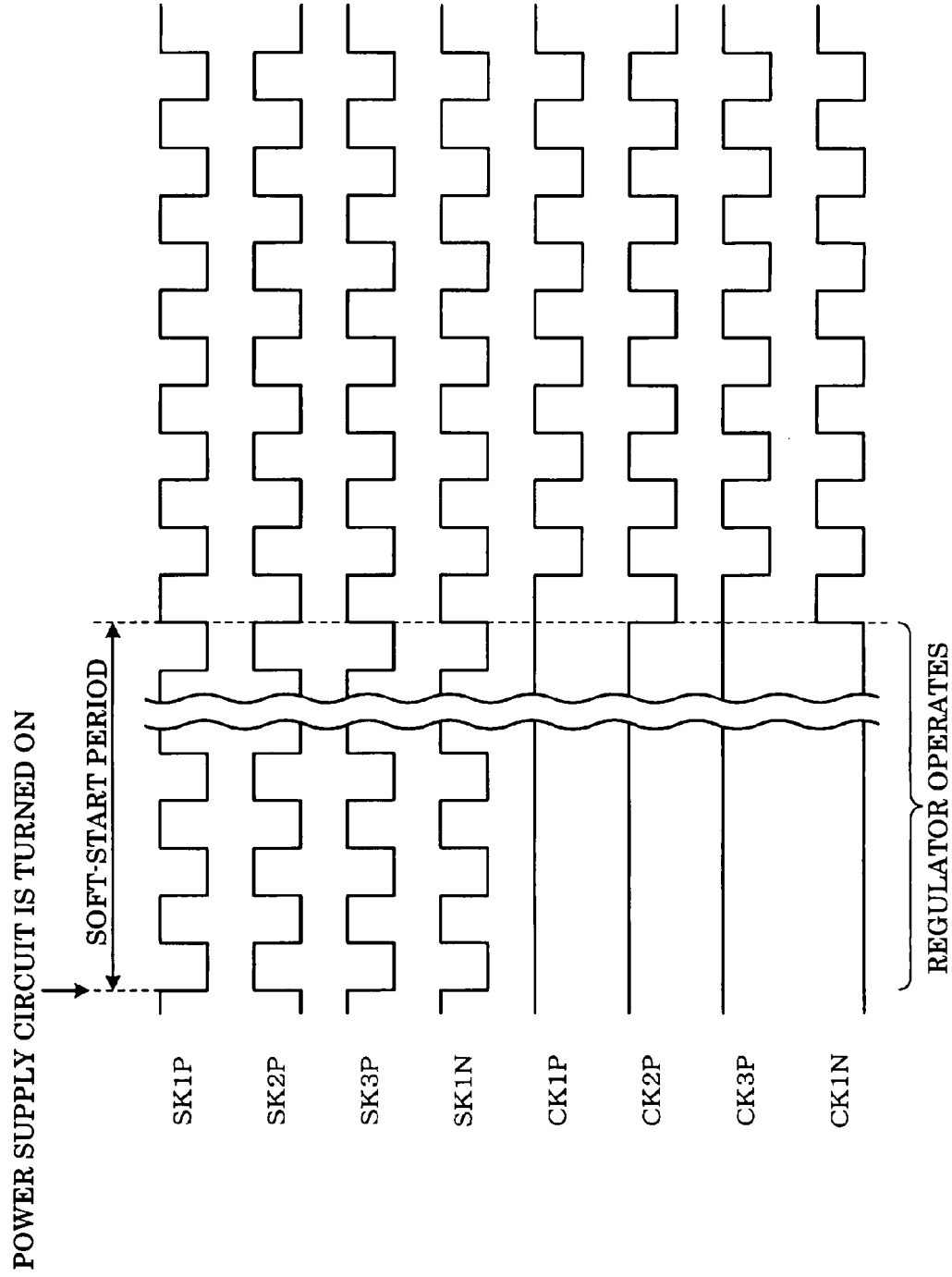
FIG. 7 is a view showing an example of the timing of a charge clock signal according to a modification.

FIG. 7 shows an example of the timings of the charge clock signals CK1P to CK3P, CK1N, SK1P to SK3P, and SK1N according to this modification.

In FIG. 7, the same sections as in FIG. 5 are indicated by the same symbols. Description of these sections is appropriately omitted. According to this modification, the power supply generation circuits are sequentially activated in the soft-start period which starts after activating the voltage booster circuit 110. Therefore, the charge-pump operation is performed in the soft-start period using the transistors with a high on-resistance, whereby a rush current which flows into the stabilization capacitors SC1 to SC3 can be suppressed.

After the soft-start period, the charge clock signals CK1P to CK3P, CK1N, SK1P to SK3P, and SK1N are operated as shown in FIG. 3. This causes the charge-pump operation to be performed using the transistors PT1 to PT3 and NT1 with a low on-resistance after the soft-start period.

According to this modification, even if the power supply generation circuit is activated after activating the voltage booster circuit 110, a rush current which flows into the stabilization capacitors SC1 to SC3 can be suppressed, whereby a change in the system power supply voltage AVDD can be eliminated.

2. Liquid Crystal Device

A display driver to which the power supply circuit according to this embodiment or the modification of this embodiment is applied, a liquid crystal device including the same, an electro-optical device, and an electronic instrument are described below.

Figure 8:
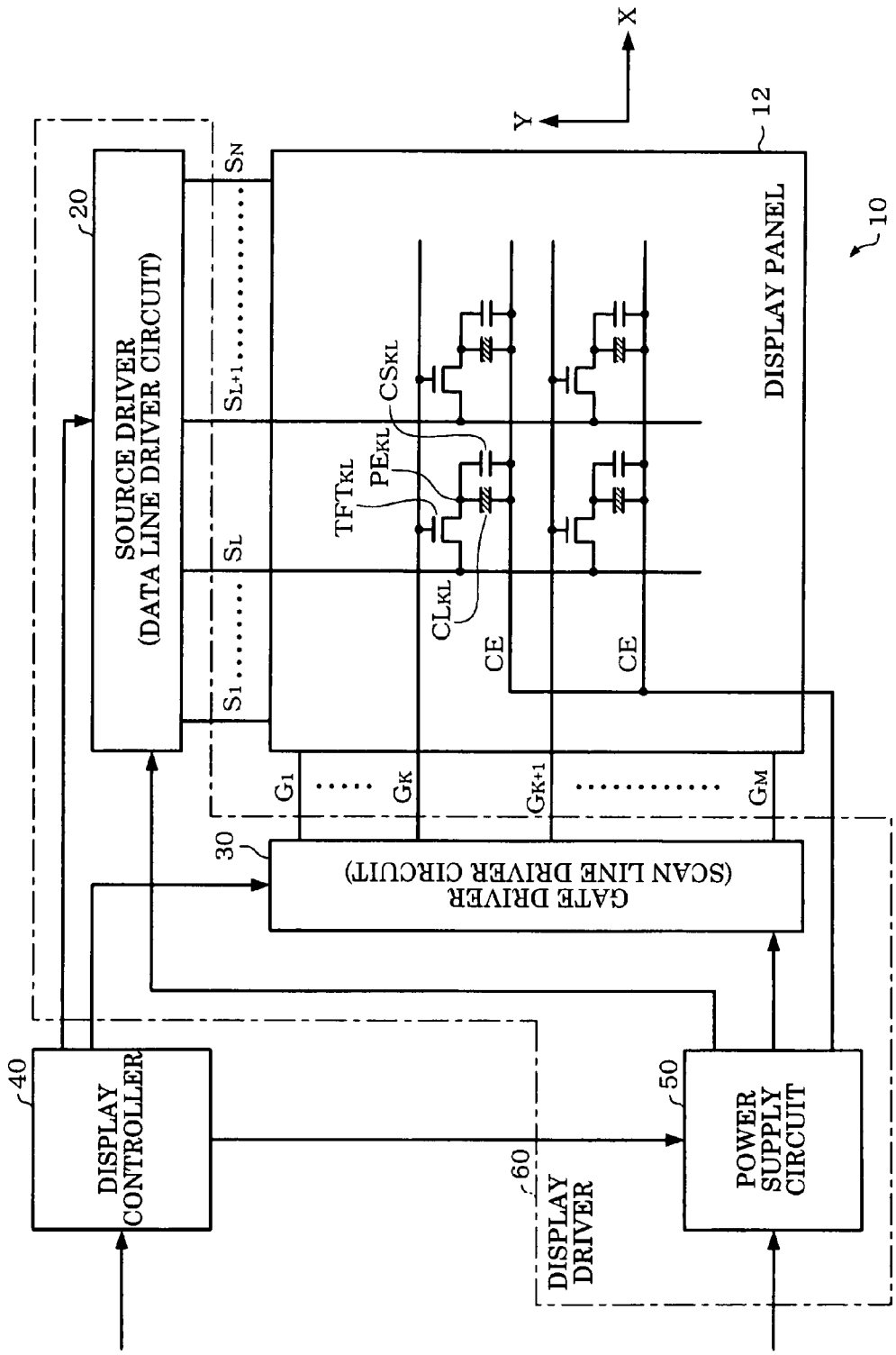
FIG. 8 is a block diagram showing a liquid crystal device including a power supply circuit according to one embodiment of the invention.

FIG. 8 shows an example of a block diagram of a liquid crystal device including the power supply circuit according to this embodiment.

A liquid crystal device 10 (display device in a broad sense) includes a display panel 12 (liquid crystal display (LCD) panel in a narrow sense), a source driver 20 (data line driver circuit in a narrow sense), a gate driver 30 (scan line driver circuit in a narrow sense), a display controller 40, and a power supply circuit 50. The liquid crystal device 10 need not necessarily include all of these circuit blocks. The liquid crystal device 10 may have a configuration in which some of these circuit blocks are omitted.

The display panel 12 (electro-optical device in a broad sense) includes gate lines (scan lines in a narrow sense), source lines (data lines in a narrow sense), and pixel electrodes specified by the gate lines and the source lines. In this case, an active matrix type liquid crystal device may be formed by connecting a thin film transistor (TFT; switching element in a broad sense) with the source line and connecting the pixel electrode with the TFT.

Specifically, the display panel 12 is formed on an active matrix substrate (e.g. glass substrate). Gate lines $G_1$ to $G_M$ (M is a positive integer equal to or larger than two), arranged in a direction Y in FIG. 1 and extending in a direction X, and source lines $S_1$ to $S_N$ (N is a positive integer equal to or larger than two), arranged in the direction X and extending in the direction Y, are disposed on the active matrix substrate. A thin film transistor $TFT_{KL}$ (switching element in a broad sense) is provided at a position corresponding to the intersection of the gate line $G_K$ ($1 \leq K \leq M$, K is a positive integer) and the source line $S_L$ ($1 \leq L \leq N$, L is a positive integer).

A gate electrode of the thin film transistor $TFT_{KL}$ is connected with the gate line $G_K$, a source electrode of the thin film transistor $TFT_{KL}$ is connected with the source line $S_L$, and a drain electrode of the thin film transistor $TFT_{KL}$ is connected with a pixel electrode $PE_{KL}$. A liquid crystal capacitor $CL_{KL}$ (liquid crystal element) and a storage capacitor $CS_{KL}$ are formed between the pixel electrode $PE_{KL}$ and a common electrode CE opposite to the pixel electrode $PE_{KL}$ through a liquid crystal (electro-optical material in a broad sense). The liquid crystal is sealed between the active matrix substrate provided with the thin film transistor $TFT_{KL}$, the pixel electrode $PE_{KL}$, and the like and a common substrate provided with the common electrode CE. The transmissivity of the pixel changes depending on the voltage applied between the pixel electrode $PE_{KL}$ and the common electrode CE.

The voltage level of a common voltage VCOM (high-potential-side voltage VCOMH and low-potential-side voltage VCOML) applied to the common electrode CE is generated by a common voltage generation circuit included in the power supply circuit 50. The common electrode CE may be formed in a striped pattern corresponding to each gate line instead of forming the common electrode CE over the entire common substrate.

The source driver 20 drives the source lines $S_1$ to $S_N$ of the display panel 12 based on grayscale data. The gate driver 30 scans (sequentially drives) the gate lines $G_1$ to $G_M$ of the display panel 12.

The display controller 40 controls the source driver 20, the gate driver 30, and the power supply circuit 50 according to the information set by a host (not shown) such as a central processing unit (CPU). Specifically, the display controller 40 sets the operation mode of the source driver 20 and the gate driver 30 or supplies a vertical synchronization signal or a horizontal synchronization signal generated therein to the source driver 20 and the gate driver 30, and controls the power supply circuit 50 regarding the polarity inversion timing of the voltage level of the common voltage VCOM applied to the common electrode CE, for example.

The power supply circuit 50 generates various voltage levels (grayscale voltages) necessary for driving the display panel 12 and the voltage level of the common voltage VCOM of the common electrode CE based on a reference voltage supplied from the outside. The power supply circuit 50 has the function of the power supply circuit according to this embodiment or the modification of this embodiment. The power supply circuit 50 may generate the power supply of at least one of the gate driver 30 and the source driver 20.

In the liquid crystal device 10 having such a configuration, the source driver 20, the gate driver 30, and the power supply circuit 50 cooperate to drive the display panel 12 based on grayscale data supplied from the outside under control of the display controller 40.

In FIG. 8, the liquid crystal device 10 includes the display controller 40. Note that the display controller 40 may be provided outside the liquid crystal device 10. Alternatively, the host may be provided in the liquid crystal device 10 together with the display controller 40. Some or all of the source driver 20, the gate driver 30, the display controller 40, and the power supply circuit 42 may be formed on the display panel 12.

In FIG. 8, a display driver 60 may be formed as a semiconductor device (integrated circuit or IC) by integrating the source driver 20, the gate driver 30, and the power supply circuit 50. The display driver 60 may include the display controller 40. In FIG. 8, the display driver 60 may be a semiconductor device in which the source driver 20 or the gate driver 30 and the power supply circuit 50 are integrated.

2.1 Source Driver

Figure 9:
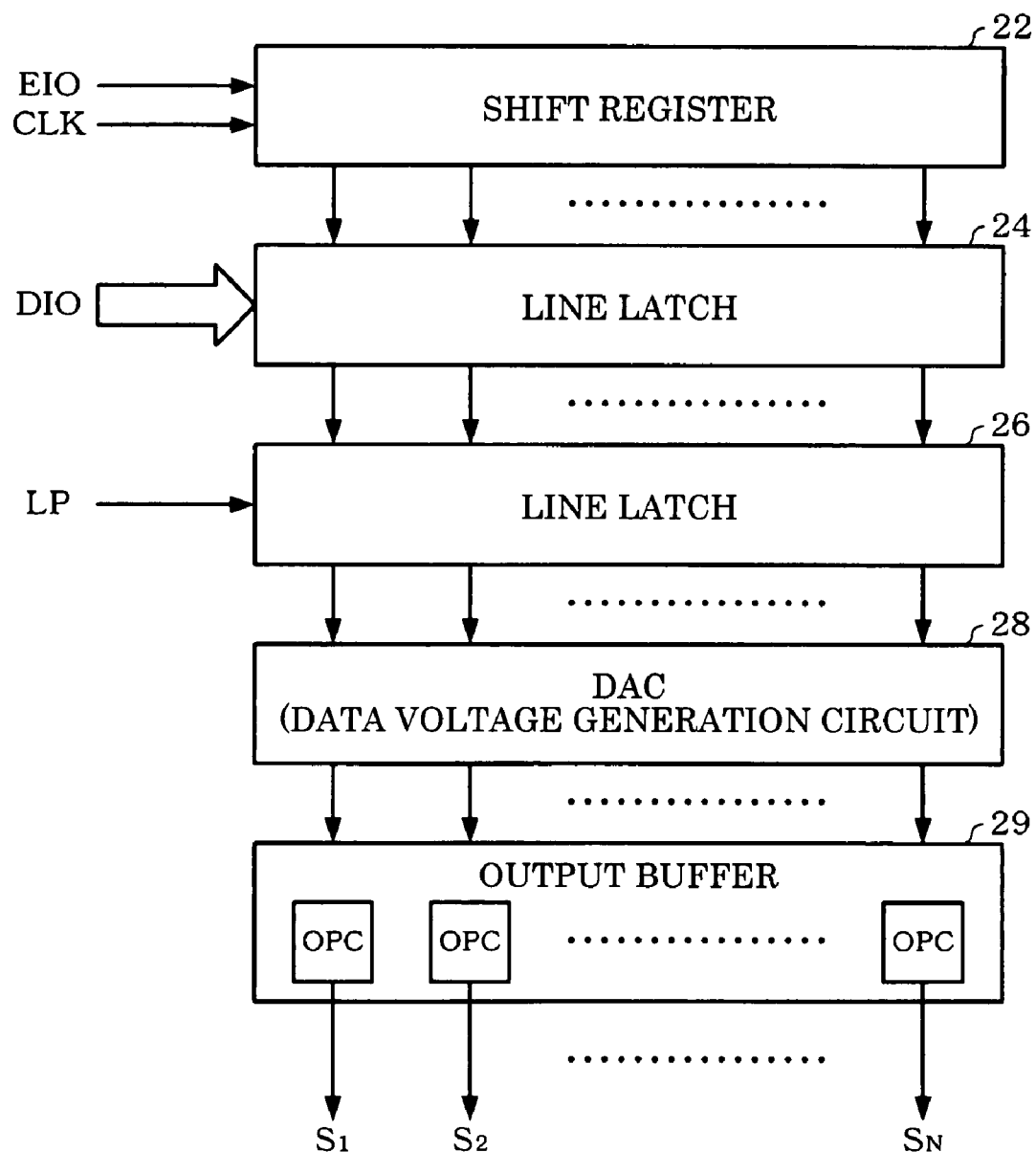
FIG. 9 is a block diagram showing a configuration example of a source driver shown in FIG. 8.

FIG. 9 shows a configuration example of the source driver 20 shown in FIG. 8.

The source driver 20 includes a shift register 22, line latches 24 and 26, a digital-to-analog converter (DAC) 28 (data voltage generation circuit in a broad sense), and an output buffer 29.

The shift register 22 includes flip-flops provided corresponding to the source lines and sequentially connected. The shift register 22 holds an enable input-output signal EIO in synchronization with a clock signal CLK, and sequentially shifts the enable input-output signal EIO to the adjacent flip-flops in synchronization with the clock signal CLK.

Grayscale data (DIO) is input to the line latch 24 from the display controller 40 in units of 18 bits (6 bits (grayscale data)×3 (each color of RGB)), for example. The line latch 24 latches the grayscale data (DIO) in synchronization with the enable input-output signal EIO sequentially shifted by each flip-flop of the shift register 22.

The line latch 26 latches the grayscale data of one horizontal scan latched by the line latch 24 in synchronization with a horizontal synchronization signal LP supplied from the display controller 40.

The DAC 28 generates an analog data voltage supplied to each source line. Specifically, the DAC 28 selects one of the grayscale voltages from the power supply circuit 50 shown in FIG. 8 based on the digital grayscale data from the line latch 26, and outputs an analog data voltage corresponding to the digital grayscale data.

The output buffer 29 buffers the data voltage from the DAC 28, and drives the source line by outputting the data voltage to the source line. Specifically, the output buffer 29 includes voltage-follower-connected operational amplifier circuit blocks OPC provided in source line units. The operational amplifier circuit block OPC subjects the data voltage from the DAC 28 to impedance conversion and outputs the resulting data voltage to the source line.

FIG. 9 employs a configuration in which the digital grayscale data is subjected to digital-analog conversion and output to the source line through the output buffer 29. A configuration may also be employed in which an analog image signal is sampled/held and output to the source line through the output buffer 29.

2.2 Gate Driver

Figure 10:
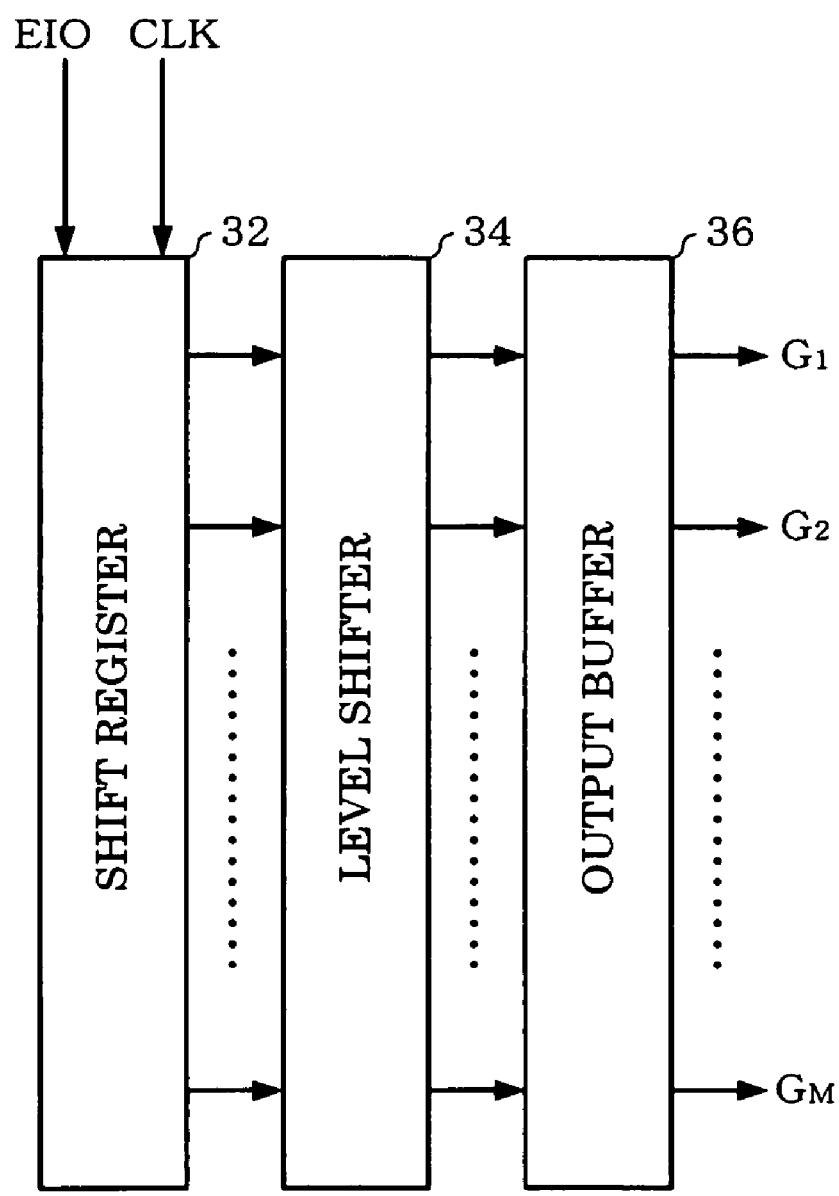
FIG. 10 is a block diagram showing a configuration example of a gate driver shown in FIG. 8.

FIG. 10 shows a configuration example of the gate driver 30 shown in FIG. 8.

The gate driver 30 includes a shift register 32, a level shifter 34, and an output buffer 36.

The shift register 32 includes flip-flops provided corresponding to the gate lines and sequentially connected. The shift register 32 holds the enable input-output signal EIO in the flip-flop in synchronization with the clock signal CLK, and sequentially shifts the enable input-output signal EIO to the adjacent flip-flops in synchronization with the clock signal CLK. The enable input-output signal EIO input to the shift register 32 is the vertical synchronization signal supplied from the display controller 40.

The level shifter 34 shifts the voltage level from the shift register 32 to the voltage level corresponding to the liquid crystal element of the display panel 12 and the transistor capability of the TFT. Since a high voltage level (e.g. 20 V to 50 V) is required as the above voltage level, a high voltage process differing from other logic circuit sections is used for the level shifter 34.

The output buffer 36 buffers the scan voltage shifted by the level shifter 34, and drives the gate line by outputting the scan voltage to the gate line.

2.3 Power Supply Circuit

Figure 11:
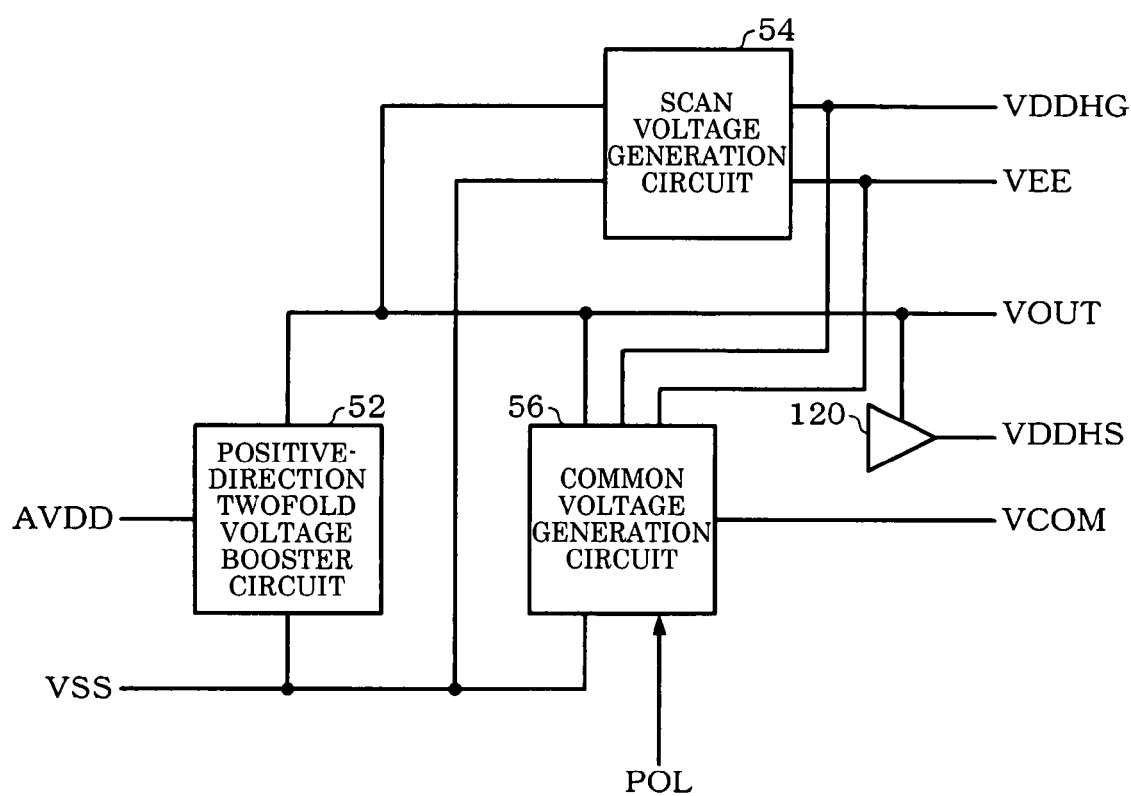
FIG. 11 is a block diagram showing a configuration example of the power supply circuit shown in FIG. 8.

FIG. 11 shows a configuration example of the power supply circuit shown in FIG. 8.

The power supply circuit 50 includes a positive-direction two-fold voltage booster circuit 52, a scan voltage generation circuit 54, and a common voltage generation circuit 56. The system ground power supply voltage VSS (first power supply voltage) and the system power supply voltage AVDD are supplied to the power supply circuit 50.

The system ground power supply voltage VSS and the system power supply voltage AVDD are supplied to the positive-direction twofold voltage booster circuit 52. The positive-direction twofold voltage booster circuit 52 generates a power supply voltage VOUT (second power supply voltage) by twofold boosting the system power supply voltage AVDD in the positive direction with respect to the system ground power supply voltage VSS. Specifically, the positive-direction twofold voltage booster circuit 52 boosts the voltage between the system ground power supply voltage VSS and the system power supply voltage AVDD by a factor of two. The positive-direction twofold voltage booster circuit 52 may be formed using a known charge-pump circuit. The power supply voltage VOUT is supplied to the source driver 20, the gate driver 30, and the common electrode voltage generation circuit 56. It is preferred that the positive-direction twofold voltage booster circuit 52 output the power supply voltage VOUT obtained by boosting the system power supply voltage AVDD in the positive direction by a factor of two by boosting the system power supply voltage AVDD by a factor of two or more and regulating the voltage level using a regulator. The regulator 120 regulates the power supply voltage VOUT, and supplies the regulated voltage to the source driver 20.

The system ground power supply voltage VSS and the power supply voltage VOUT are supplied to the scan voltage generation circuit 54. The scan voltage generation circuit 54 generates a scan voltage. The scan voltage is a voltage applied to the gate line driven by the gate driver 30. The high-potential-side voltage and the low-potential-side voltage of the scan voltage are VDDHG and VEE, respectively. In this embodiment, the high-potential-side voltage VDDHG and the low-potential-side voltage VEE of the scan voltage are also supplied to the common voltage generation circuit 56.

The common voltage generation circuit 56 generates the common voltage VCOM. The common voltage generation circuit 56 outputs the high-potential-side voltage VCOMH or the low-potential-side voltage VCOML as the common electrode voltage VCOM based on a polarity inversion signal POL. The polarity inversion signal POL is generated by the display controller 40 in synchronization with the polarity inversion timing.

Figure 12:
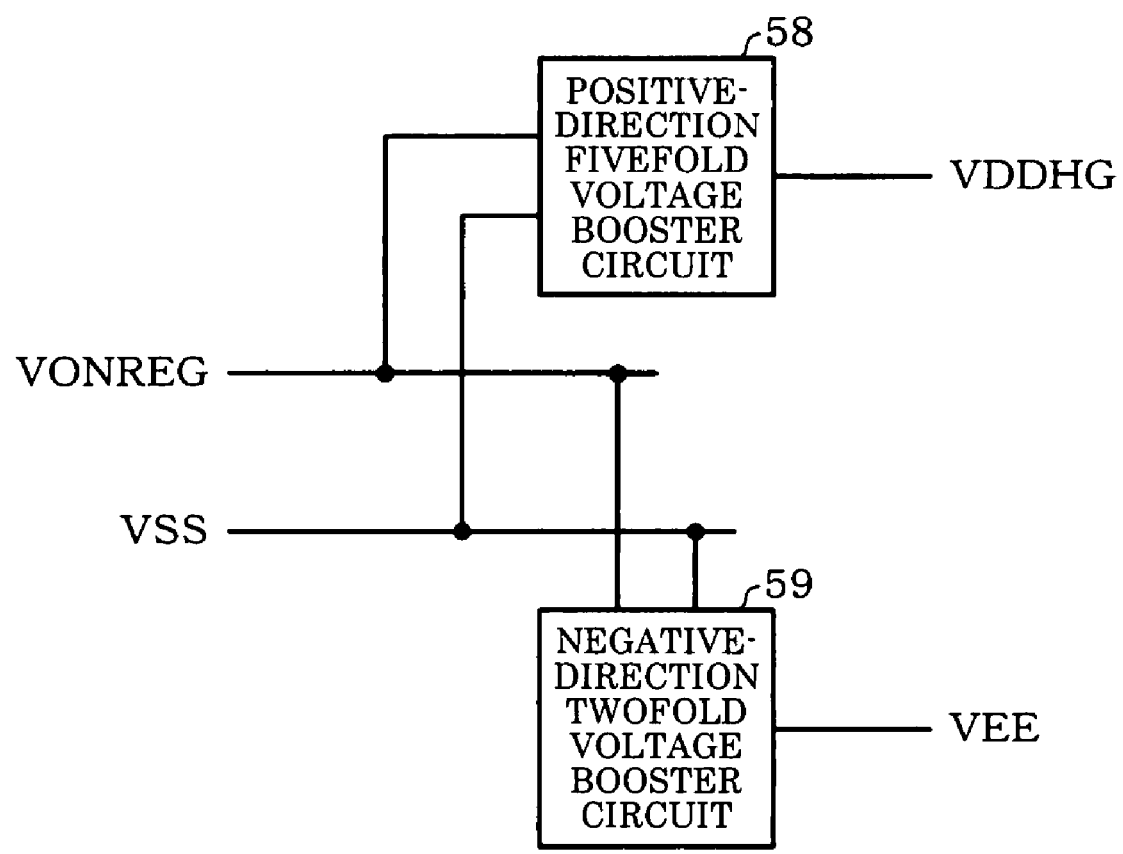
FIG. 12 is a block diagram showing a configuration example of a scan voltage generation circuit shown in FIG. 11.

FIG. 12 shows a configuration example of the scan voltage generation circuit 54 shown in FIG. 11.

The scan voltage generation circuit 54 includes a positive-direction fivefold voltage booster circuit 58 and a negative-direction twofold voltage booster circuit 59.

The positive-direction fivefold voltage booster circuit 58 generates a power supply voltage VDDHG by boosting the power supply voltage VONREG in the positive direction by a factor of three with respect to the system ground power supply voltage VSS. The power supply voltage VONREG is a voltage obtained by regulating the power supply voltage VOUT using a regulator. The positive-direction fivefold voltage booster circuit 58 boosts the voltage between the system ground power supply voltage VSS and the power supply voltage VONREG by a factor of five. The positive-direction fivefold voltage booster circuit 58 may be formed using a known charge-pump circuit.

The negative-direction twofold voltage booster circuit 59 generates the low-potential-side voltage VEE of the scan voltage by boosting the power supply voltage VOUT in the negative direction by a factor of two with respect to the system ground power supply voltage VSS. Specifically, the negative-direction twofold voltage booster circuit 59 boosts the voltage between the system ground power supply voltage VSS and the power supply voltage VOUT by a factor of −2. The negative-direction twofold voltage booster circuit 59 may be formed using a known charge-pump circuit.

Each of the positive-direction fivefold voltage booster circuit 58 and the negative-direction twofold voltage booster circuit 59 may boost the voltage by a boost factor greater than a specific boost factor, regulate the voltage level using a regulator, and output the regulated voltage.

When the common voltage generation circuit 56 shown in FIG. 11 is formed using a high voltage process in the same manner as the scan voltage generation circuit 54, it is preferred that the amplitude of the gate voltage of a metal-oxide semiconductor (MOS) transistor of the common voltage generation circuit 56 be an amplitude between the high-potential-side voltage VDDHG and the low-potential-side voltage VEE generated by the scan voltage generation circuit 54. In this case, the impedance can be sufficient reduced when each MOS transistor is set in a conducting state.

Figure 13:
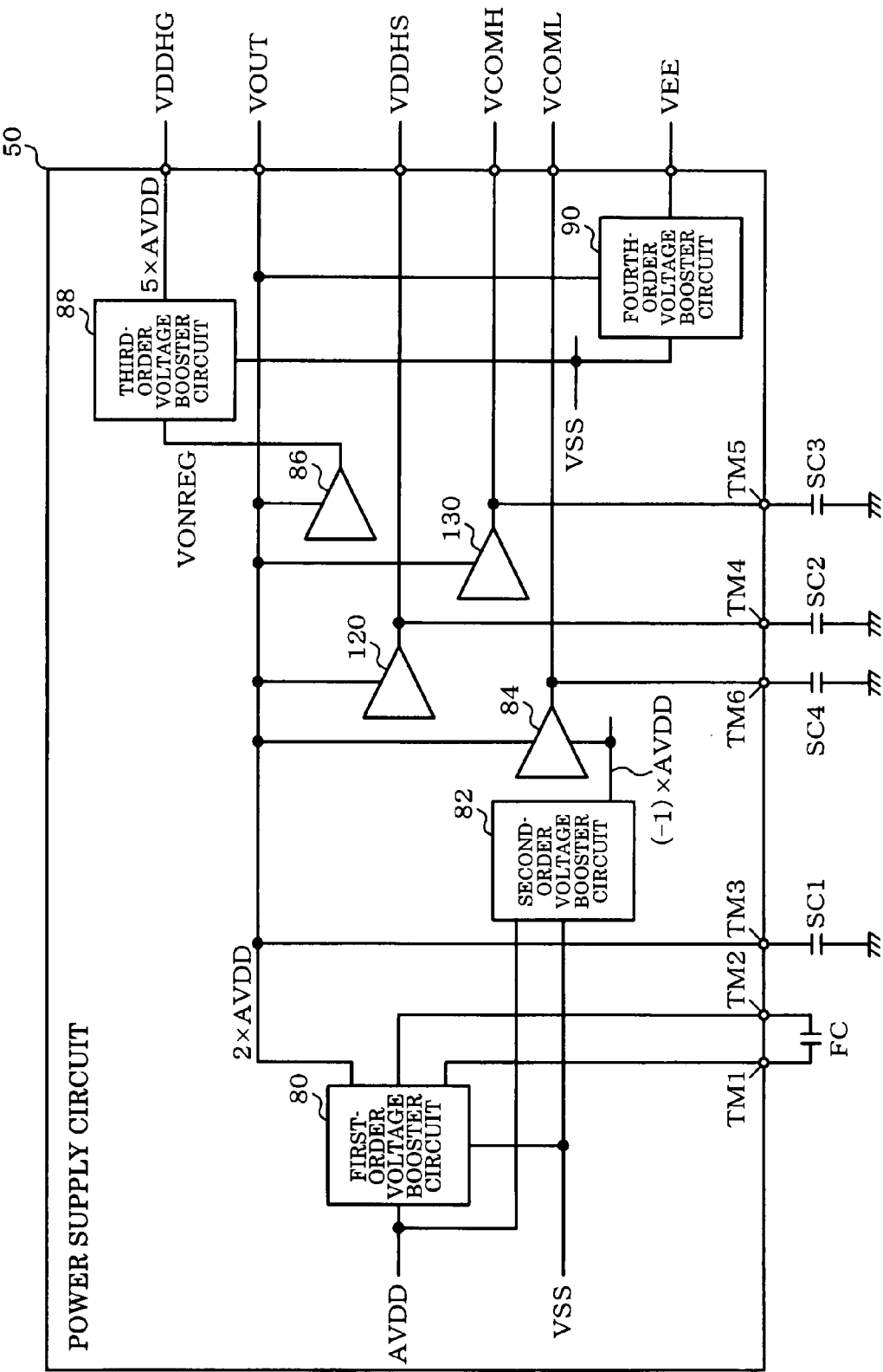
FIG. 13 is a view showing a configuration of the power supply circuit shown in FIG. 11.

FIG. 13 shows a hardware configuration example of the power supply circuit 50 shown in FIG. 11.

In FIG. 13, the same sections as in FIG. 1 are indicated by the same symbols. Description of these sections is appropriately omitted. In FIG. 13, a first-order voltage booster circuit 80 implements the function of the voltage booster circuit 110 shown in FIG. 1. A second-order voltage booster circuit 82 boosts the voltage between the system power supply voltage AVDD and the system ground power supply voltage VSS in the negative direction with respect to the system ground power supply voltage VSS. A regulator 84 generates the low-potential-side voltage VCOML of the common voltage VCOM using the power supply voltage generated by the second-order voltage booster circuit 82 as the low-potential-side power supply voltage and the power supply voltage generated by the first-order voltage booster circuit 80 as the high-potential-side power supply voltage. The output of the regulator 84 is connected with one end of a stabilization capacitor SC4 via a terminal TM6.

A regulator 86 operates using the boost voltage generated by the first-order voltage booster circuit 80 as the power supply voltage, and outputs the power supply voltage VONREG. A third-order voltage booster circuit 88 outputs the power supply voltage VDDHG obtained by boosting the voltage between the power supply voltage VONREG and the system ground power supply voltage VSS in the positive direction by a factor of five. The third-order voltage booster circuit 88 implements the function of the positive-direction fivefold voltage booster circuit 58 shown in FIG. 12.

A fourth-order voltage booster circuit 90 outputs the power supply voltage VEE obtained by boosting the voltage between the power supply voltage VOUT and the system ground power supply voltage VSS in the negative direction by a factor of two. The fourth-order voltage booster circuit 90 implements the function of the negative-direction twofold voltage booster circuit 59 shown in FIG. 12.

Figure 14:
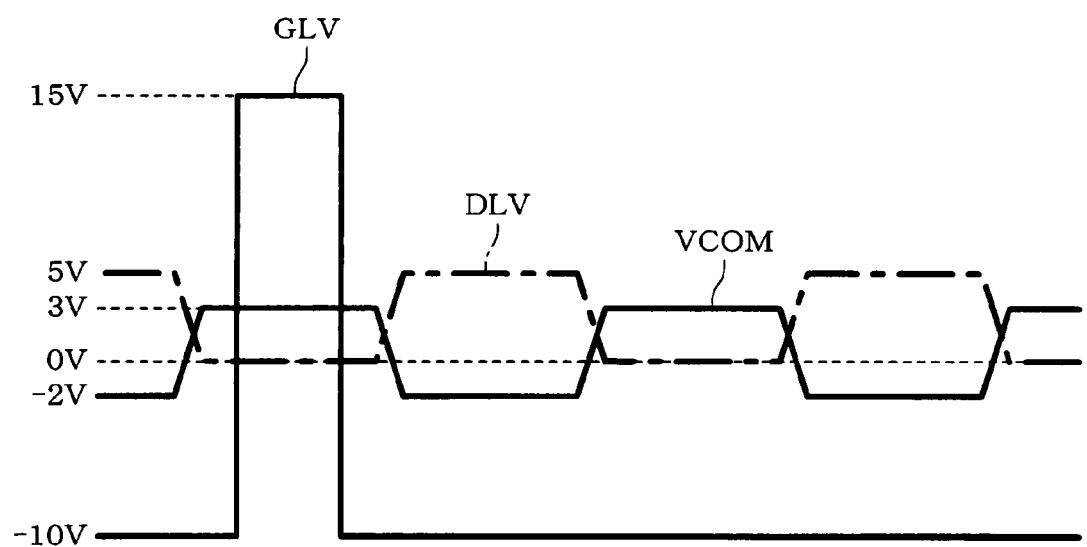
FIG. 14 is a view showing an example of a drive waveform of a display panel shown in FIG. 8.

FIG. 14 shows an example of a drive waveform of the display panel 12 shown in FIG. 8.

A grayscale voltage DLV corresponding to the grayscale value of grayscale data is applied to the source line. In FIG. 14, the grayscale voltage DLV has an amplitude of 5 V with respect to the system ground power supply voltage VSS (=0 V).

A scan voltage GLV at the low-potential-side voltage VEE (=−10 V) is applied to the gate line in an unselected state, and a scan voltage GLV at the high-potential-side voltage VDDHG (=15 V) is applied to the gate line in a selected state.

The common voltage VCOM at the high-potential-side voltage VCOMH (=3 V) or the low-potential-side voltage VCOML (=−2 V) is applied to the common electrode CE. The polarity of the voltage level of the common voltage VCOM is reversed with respect to a given voltage in synchronization with the polarity inversion timing. FIG. 14 shows the waveform of the common voltage VCOM during scan line inversion drive. The polarity of the grayscale voltage DLV applied to the source line is also reversed with respect to a given voltage in synchronization with the polarity inversion timing.

2.4 Polarity Inversion Drive

A liquid crystal element deteriorates when a direct-current voltage is applied for a long period of time. This makes it necessary to employ a drive method in which the polarity of the voltage applied to the liquid crystal element is reversed in units of specific periods. As such a drive method, frame inversion drive, scan (gate) line inversion drive, data (source) line inversion drive, dot inversion drive, and the like can be given.

Frame inversion drive reduces power consumption, but results in an insufficient image quality. Data line inversion drive and dot inversion drive ensure an excellent image quality, but require a high voltage for driving a display panel.

This embodiment employs scan line inversion drive. In scan line inversion drive, the polarity of the voltage applied to the liquid crystal element is reversed in units of scan periods (gate lines). For example, a positive voltage is applied to the liquid crystal element in the first scan period (gate line), a negative voltage is applied to the liquid crystal element in the second scan period, and a positive voltage is applied to the liquid crystal element in the third scan period. In the subsequent frame, a negative voltage is applied to the liquid crystal element in the first scan period, a positive voltage is applied to the liquid crystal element in the second scan period, and a negative voltage is applied to the liquid crystal element in the third scan period.

In scan line inversion drive, the polarity of the voltage level of the common voltage VCOM applied to the common electrode CE is reversed in units of scan periods.

Figure 15:
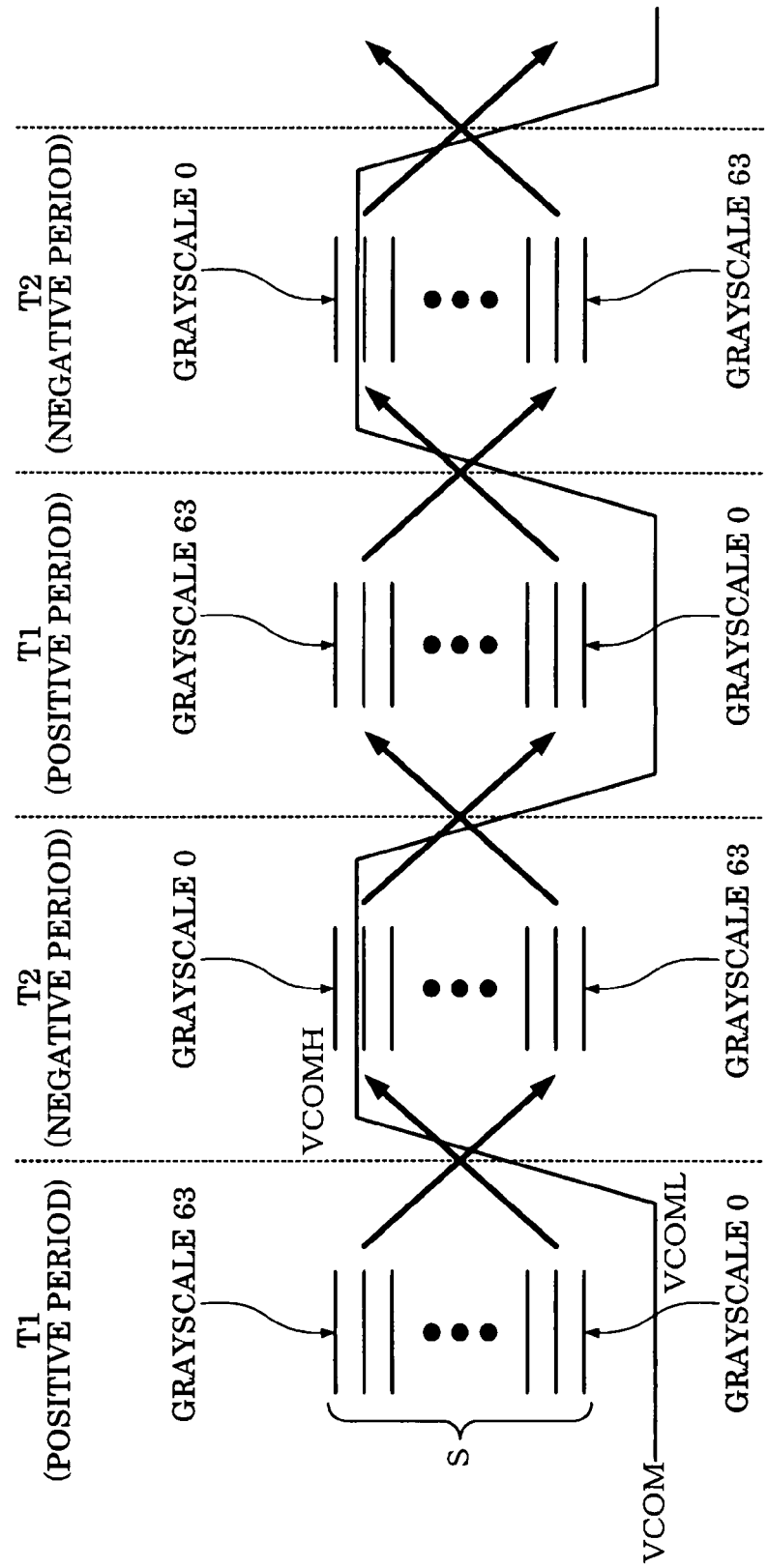
FIG. 15 is a view illustrative of common electrode polarity inversion drive according to one embodiment of the invention.

Specifically, the voltage level of the common voltage VCOM is set at the low-potential-side voltage VCOML in a positive period T1 (first period) and is set at the high-potential-side voltage VCOMH in a negative period T2 (second period), as shown in FIG. 15. The polarity of the grayscale voltage applied to the source line is also reversed at the above timing. The low-potential-side voltage VCOML is a voltage level obtained by reversing the polarity of the high-potential-side voltage VCOMH with respect to a given voltage level.

The positive period T1 is a period in which the voltage level of the pixel electrode provided with the grayscale voltage via the source line becomes higher than the voltage level of the common electrode CE. In the period T1, a positive voltage is applied to the liquid crystal element. The negative period T2 is a period in which the voltage level of the pixel electrode provided with the grayscale voltage via the source line becomes lower than the voltage level of the common electrode CE. In the period T2, a negative voltage is applied to the liquid crystal element.

A voltage required for driving the display panel can be reduced by reversing the polarity of the common voltage VCOM. This makes it possible to reduce the withstand voltage of the driver circuit, whereby the driver circuit manufacturing process can be simplified, and the manufacturing cost can be reduced.

3. Electronic Instrument

Figure 16:
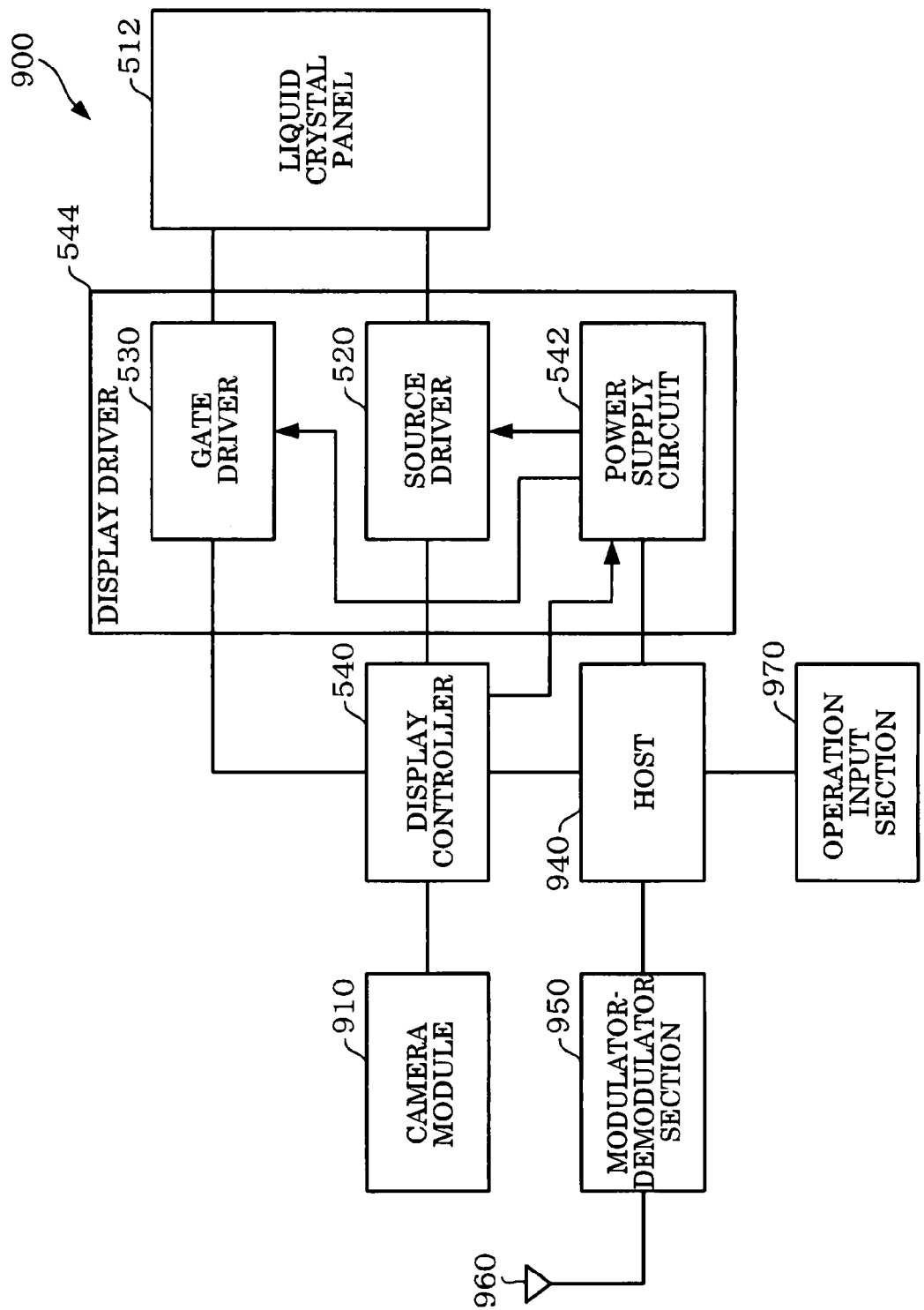
FIG. 16 is a block diagram showing a configuration example of an electronic instrument according to one embodiment of the invention.

FIG. 16 is a block diagram showing a configuration example of an electronic instrument to which the display driver 60 shown in FIG. 12 is applied. FIG. 16 is a block diagram showing a configuration example of a portable telephone as an example of the electronic instrument.

A portable telephone 900 includes a camera module 910. The camera module 910 includes a CCD camera, and supplies data of an image obtained by the CCD camera to a display controller 540 in a YUV format. The display controller 540 has the function of the display controller 40 shown in FIG. 8.

The portable telephone 900 includes a display panel 512. The display panel 512 is driven by a source driver 520 and a gate driver 530. The display panel 512 includes gate lines, source lines, and pixels. The display panel 512 has the function of the display panel 12 shown in FIG. 8.

The display controller 540 is connected with the source driver 520 and the gate driver 530, and supplies grayscale data in an RGB format to the source driver 520.

A power supply circuit 542 is connected with the source driver 520 and the gate driver 530, and supplies drive power supply voltages to the source driver 520 and the gate driver 530. The power supply circuit 542 has the function of the power supply circuit 50 shown in FIG. 8. The portable telephone 900 includes the source driver 520, the gate driver 530, and the power supply circuit 542 as a display driver 544. The display driver 544 drives the display panel 512.

A host 940 is connected with the display controller 540. The host 940 controls the display controller 540. The host 940 demodulates grayscale data received via an antenna 960 using a modulator-demodulator section 950, and supplies the demodulated grayscale data to the display controller 540. The display controller 540 causes the source driver 520 and the gate driver 530 to display an image on the display panel 512 based on the grayscale data. The source driver 520 has the function of the source driver 20 shown in FIG. 8. The gate driver 530 has the function of the gate driver 30 shown in FIG. 8.

The host 940 modulates grayscale data generated by the camera module 910 using the modulator-demodulator section 950, and directs transmission of the modulated data to another communication device via the antenna 960.

The host 940 transmits and receives grayscale data, captures an image using the camera module 910, and displays an image on the display panel 512 based on operation information from an operation input section 970.

According to the above configuration, an electronic instrument can be provided which prevents a rush current and a malfunction due to a change in the voltage level of the system power supply voltage AVDD, even if the power supply generation circuits are sequentially activated in order to generate the power supply voltages.

Although only some embodiments of the invention have been described above in detail, those skilled in the art would readily appreciate that many modifications are possible in the embodiments without materially departing from the novel teachings and advantages of the invention. Accordingly, such modifications are intended to be included within the scope of the invention. For example, the invention may be applied not only to drive a liquid crystal panel, but also to drive an electroluminescent display device or a plasma display device.

Some of the requirements of any claim of the invention may be omitted from a dependent claim which depends on that claim. Some of the requirements of any independent claim of the invention may be allowed to depend on any other independent claim.

What is claimed is:

1. A power supply circuit that boosts a given voltage to generate one or more power supply voltages, the power supply circuit comprising:

a charge-pump control circuit including switching elements for generating a boost voltage by a charge-pump operation using charge stored in a flying capacitor;

a soft-start circuit that prevents a rush current from flowing into the flying capacitor; and a power supply generation circuit that is connected with a stabilization capacitor and generates a power supply voltage using the boost voltage as a power; supply, after the power supply generation circuit has been turned ON in a state in which the charge-pump control circuit generates the boost voltage by the charge-pump operation, the switching elements being turned OFF, and the soft-start circuit generating the boost voltage by a charge-pump operation, and the soft-start circuit including switching elements provided in parallel with the switching elements of the charge-pump control circuit and having an on-resistance higher than those of the switching elements of the charge-pump control circuit.

2. The power supply circuit as defined in claim 1, the soft-start circuit generating the boost voltage by the charge-pump operation immediately after the power supply circuit has been turned ON, and the charge-pump control circuit then generating the boost voltage by the charge-pump operation.

3. The power supply circuit as defined in claim 1, after the power supply circuit has been turned ON, the switching elements of the soft-start circuit being switch-controlled irrespective of whether or not to switch-control the switching elements of the charge-pump control circuit.

4. A power supply circuit that boosts a given voltage to generate one or more power supply voltages, the power supply circuit comprising:

a charge-pump control circuit including switching elements for generating a boost voltage by a charge-pump operation using charge stored in a flying capacitor;

a soft-start circuit that prevents a rush current from flowing into the flying capacitor; and a power supply generation circuit that is connected with a stabilization capacitor and generates a power supply voltage using the boost voltage as a power; supply, after the power supply circuit has been turned ON, the power supply generation circuit is turned ON in a state in which the switching elements are turned OFF, the soft-start circuit then generating the boost voltage by a charge-pump operation, and the charge-pump control circuit then generating the boost voltage by the charge-pump operation by switch-controlling the switching elements, and the soft-start circuit including switching elements provided in parallel with the switching elements of the charge pump control circuit and having an on-resistance higher than those of the switching elements of the charge-pump control circuit.

5. A display driver which drives an electro-optical device, the display driver comprising:

a source driver which drives source lines of the electro-optical device; and the power supply circuit as defined in claim 1 which generates a power supply for the source driver.

6. A display driver which drives an electro-optical device, the display driver comprising:

a source driver which drives source lines of the electro-optical device; and the power supply circuit as defined in claim 4 which generates a power supply for the source driver.

7. An electro-optical device comprising:

gate lines;

source lines;

pixel electrodes;

a gate line driver circuit which scans the gate lines;

a source driver which drives the source lines based on grayscale data; and the power supply circuit as defined in claim 1 which generates a power supply for at least one of the gate driver and the source driver.

8. An electro-optical device comprising:

gate lines;

source lines;

pixel electrodes;

a gate line driver circuit which scans the gate lines;

a source driver which drives the source lines based on grayscale data; and the power supply circuit as defined in claim 4 which generates a power supply for at least one of the gate driver and the source driver.

9. An electronic instrument comprising the power supply circuit as defined in claim 1.

10. An electronic instrument comprising the power supply circuit as defined in claim 4.

11. An electronic instrument comprising the electro-optical device as defined in claim 7.

12. An electronic instrument comprising the electro-optical device as defined in claim 8.

* * * * *